(12) United States Patent
Soeder

(10) Patent No.: US 9,116,717 B2
(45) Date of Patent: Aug. 25, 2015

(54) RUN-TIME INTERCEPTION OF SOFTWARE METHODS

(75) Inventor: Derek A. Soeder, Sulphur Springs, TX (US)

(73) Assignee: Cylance Inc., Irvine, CA (US)

( * ) Notice: Subject to any disclaimer, the term of this patent is extended or adjusted under 35 U.S.C. 154(b) by 1018 days.

(21) Appl. No.: 13/118,238

(22) Filed: May 27, 2011

(65) Prior Publication Data
US 2012/0304160 A1 Nov. 29, 2012

(51) Int. Cl.
*G06F 9/44* (2006.01)
(52) U.S. Cl.
CPC ................................ *G06F 9/4426* (2013.01)
(58) Field of Classification Search
None
See application file for complete search history.

(56) References Cited

U.S. PATENT DOCUMENTS

| | | | |
|---|---|---|---|
| 5,335,344 A * | 8/1994 | Hastings | 714/35 |
| 6,026,237 A | 2/2000 | Berry et al. | |
| 6,260,187 B1 | 7/2001 | Cirne | |
| 6,282,701 B1 * | 8/2001 | Wygodny et al. | 717/125 |
| 6,356,887 B1 | 3/2002 | Berenson et al. | |
| 6,857,119 B1 * | 2/2005 | Desai | 717/145 |
| 6,968,540 B2 | 11/2005 | Beck et al. | |
| 7,281,242 B2 | 10/2007 | Inamdar | |
| 7,289,978 B2 | 10/2007 | Limoges et al. | |
| 7,313,822 B2 | 12/2007 | Ben-Itzhak | |
| 7,367,025 B1 | 4/2008 | Nikolov et al. | |
| 7,426,723 B1 | 9/2008 | Nikolov | |
| 7,437,362 B1 | 10/2008 | Ben-Natan | |
| 7,444,331 B1 | 10/2008 | Nachenberg et al. | |
| 7,458,072 B2 | 11/2008 | Moorthy et al. | |
| 7,484,209 B2 | 1/2009 | Avakian et al. | |
| 7,487,149 B2 | 2/2009 | Wong | |
| 7,493,622 B2 | 2/2009 | Borkan | |
| 7,500,227 B1 | 3/2009 | Fontana et al. | |
| 7,536,680 B2 | 5/2009 | Berry et al. | |
| 7,558,796 B1 | 7/2009 | Bromwich et al. | |
| 7,689,558 B2 | 3/2010 | Rossmann | |
| 7,725,882 B1 | 5/2010 | Spertus et al. | |
| 7,805,717 B1 | 9/2010 | Spertus et al. | |
| 7,823,137 B2 | 10/2010 | Chagoly et al. | |
| 2002/0091995 A1 * | 7/2002 | Arnold et al. | 717/124 |
| 2002/0144245 A1 * | 10/2002 | Lueh | 717/140 |
| 2002/0157020 A1 | 10/2002 | Royer | |

(Continued)

OTHER PUBLICATIONS

U.S. Appl. No. 12/939,766, filed Nov. 4, 2010, Soeder (Continued)

*Primary Examiner* — Jue Louie
(74) *Attorney, Agent, or Firm* — Mintz Levin Cohn Ferris Glovsky and Popeo, P.C.

(57) ABSTRACT

The present disclosure involves systems and computer-implemented methods for installing software hooks. One process includes identifying a target method and a hook code, where the hook code is to execute instead of at least a portion of the target method, and wherein the target method and the hook code are executed within a managed code environment. A compiled version of the target method and a compiled version of the hook code are located in memory, where the compiled versions of the target method and the hook code are compiled in native code. Then, the compiled version of the target method is modified to direct execution of at least a portion of the compiled version of the target method to the compiled version of the hook code. The non-compiled version of the target method may be originally stored as bytecode. The managed code environment may comprise a managed .NET environment.

24 Claims, 16 Drawing Sheets

(56) References Cited

U.S. PATENT DOCUMENTS

| | | | |
|---|---|---|---|
| 2003/0204374 A1* | 10/2003 | Madsen et al. | 702/186 |
| 2003/0204719 A1 | 10/2003 | Ben-Itzhak | |
| 2004/0163077 A1* | 8/2004 | Dimpsey et al. | 717/130 |
| 2005/0039189 A1* | 2/2005 | Anderson et al. | 719/314 |
| 2005/0114848 A1* | 5/2005 | Choi et al. | 717/148 |
| 2005/0198099 A1 | 9/2005 | Motsinger et al. | |
| 2005/0203921 A1 | 9/2005 | Newman et al. | |
| 2006/0143688 A1 | 6/2006 | Futoransky et al. | |
| 2006/0212438 A1 | 9/2006 | Ng | |
| 2006/0242136 A1 | 10/2006 | Hammond et al. | |
| 2007/0011742 A1 | 1/2007 | Nakayama et al. | |
| 2007/0016685 A1 | 1/2007 | Crume | |
| 2007/0136312 A1 | 6/2007 | Shulman et al. | |
| 2007/0136802 A1 | 6/2007 | Matoba | |
| 2007/0136809 A1 | 6/2007 | Kim | |
| 2007/0156644 A1 | 7/2007 | Johnson et al. | |
| 2007/0180439 A1* | 8/2007 | Sundararajan et al. | 717/158 |
| 2007/0271375 A1 | 11/2007 | Hwang | |
| 2007/0283331 A1* | 12/2007 | Pietrek | 717/130 |
| 2008/0034424 A1 | 2/2008 | Overcash et al. | |
| 2008/0034425 A1 | 2/2008 | Overcash et al. | |
| 2008/0047009 A1 | 2/2008 | Overcash et al. | |
| 2008/0275843 A1 | 11/2008 | Lal et al. | |
| 2009/0049547 A1 | 2/2009 | Fan | |
| 2009/0055802 A1 | 2/2009 | Crosby | |
| 2009/0077573 A1 | 3/2009 | Moorthy et al. | |
| 2009/0100518 A1 | 4/2009 | Overcash | |
| 2009/0112885 A1 | 4/2009 | Markovich | |
| 2009/0112981 A1 | 4/2009 | Markovich | |
| 2009/0138848 A1 | 5/2009 | Okubo | |
| 2009/0150374 A1 | 6/2009 | Dewey et al. | |
| 2009/0172638 A1 | 7/2009 | Cobb | |
| 2009/0205047 A1 | 8/2009 | Podjarny | |
| 2010/0138817 A1 | 6/2010 | Dubinsky et al. | |
| 2012/0167057 A1* | 6/2012 | Schmich et al. | 717/130 |

OTHER PUBLICATIONS

ModSecurity "Open Source Web Application Firewall," ModSecurity FAQ, Version 2.0, Sep. 29, 2010 [online], <http://www.modsecurity.org/documentation/faq.html >, retrieved Feb. 16, 2011, 7 pages.
Warren, Susan "*A Matter of Context*," msdn, Microsoft Corporation, Jan. 14, 2001, [online], <http://msdn.microsoft.com/en-us/library/ms972109.aspx> , retrieved Feb. 16, 2011.
Perl, "Perl version 5.12.2 documentation—perlsec," [online], <http://perldoc.perl.org/perlsec.pdf>, retrieved Feb. 16, 2011, 8 pages.
Markovich, Slavik, "*Hedgehog: Host-Based Database Activity Monitoring & Prevention*," Version 2.0, Apr. 2008, [online], <http://www.sentrigo.com/sites/default/files/Sentrigo_Hedgehod_Host-Based_Database_Activity_Monitoring_Prevention_v2.1.pdf>, retrieved Feb. 16, 2011, 16 pages.
GreenSQL, "*What is GreenSQL?*", 2010, [online], <http://www.greensql.net/about>, retrieved Oct. 27, 2011, 2 pages.
Absil, Microsoft Research, "AbsIL SDK for .NET Framework." [online] Sep. 20, 2006, <http://research.microsoft.com/en-us/downloads/6a34a558-ab57-424f-a799-f0fc458101cl/default.aspx>, retrieved Oct. 25, 2011, 1 page.
Dahm, Markus, "*Apache Commons*," Byte Code Engineering Library (BCEL), 2004, [online], http:/jakarta.apache.org/bcel/, retrieved Oct. 25, 2011, 1 page.
Lee, Han Bok, et al., "*BIT: A Tool for Instrumenting Java Bytecodes*," Dec. 1997, [online], <http://research.microsoft.com/en-us/um/people/zorn/pubs/usits97-bit.pdf>, retrieved Oct. 24, 2011, 10 pages.
Mikunov, Alex, "*The Implementation of Model Constraints in .NET—II*," Aug. 24, 2003, [online], <http://www.codeproject.com/KB/dotnet/model_constraints_in_net2.aspx,>, retrieved Sep. 12, 2011, 6 pages.
Elmalki, Ziad, "*CLR Injection: Runtime Method Replacer*," Jun. 23, 2009, [online], <http://www.codeproject.com/KB/dotnet/CLRMethodInjection.aspx>, retrieved Jun. 6, 2011, 6 pages.
Brubacher, Doug, and Galen Hunt, "Detours," 1999, [online], <http://research.microsoft.com/en-us/projects/detours/>, retrieved Jun. 6, 2011, 2 pages.
Conover, Matthew "*NET*," May 2002, [online], <http://dotnethook.sourceforge.net/>, retrieved Oct. 24, 2011, 4 pages.
Larus, James , "*EEL: An Executable Editing Library*," Jun. 1, 1996, [online], <http://pages.cs.wise.edu/~larus/eel.html>, retrieved Oct. 25, 2011, 2 pages.
Romer, Ted, et al., "*Instrumentation and Optimization of WIN32/Intel Executables*," 1997, [online], <http://etch.cs.washington.edu/>, retrieved Oct. 25, 2011, 1 page.
"*ICorProfilerInfo::GetCodeInfo Method*," Microsoft Corp., [online], <http://msdn.microsoft.com/en-us/library/rns231909.aspx, retrieved Oct. 25, 2011, 2 pages.
Morrison, Vance, "*To Inline or not to Inline: That is the question*," Aug. 19, 2008, [online], <http://blogs.msdn.com/b/vancem/archive/2008/08/19/to-inline-or-not-to-inline-that-is-the-question.aspx>, retrieved Jun. 10, 2011, 5 pages.
Broman, David, *Instrumentation of internalcall methods*, 2007, [online], <http://social.msdn.microsoft.com/Forums/en-US/netfxtoolsdev/thread/6e8fb5f6-a846-492e-ad61-fb1ae05a60c8/>, retrieved Jun. 10, 2011, 3 pages.
Laffra, Chris, et al.. "Jikes Bytecode Toolkit," Mar. 31, 2000, [online], <http://www.alphaworks.ibm.com/tech/jikesbt/>, retrieved Jun. 10, 201, 2 pages.
Cohen, Geoff, and Jeff Chase, "The Java Object Instrumentation Environment," May 1, 2003, [online], <http://www.cs.duke.edu/ari/joie/>, retrieved Jun. 10, 2011, 2 pages.
"*Java Virtual Machine Debug Interface Reference*," Sun Microsystems, Inc., 1999, [online], <http://download.oracle.com/javase/1.3/docs/guide/jpda/jymdi-spec.html>, retrieved Jun. 10, 2011, 49 pages.
"*Java Virtual Machine Profiler Interface (JVMPI)*", Sun Microsystems, Inc., 1999, [online], <http://download.oracle.com/javase/1.3/docs/guide/jvmpi/jvmpi.html>, retrieved Jun. 10, 2011, 33 pages.
"*JVM Tool Interface*," Sun Microsystems, Inc., 2002, [online], retrieved Oct. 25, 2011 <http://download.oracle.com/javase/1.5.0/docs/guide/jvmti/jvmti.html>, 198 pages.
Kumar, S. Senthil, "*MethodLogger—Hook into method calls in .NET binaries*," Nov. 20, 2006, [online], retrieved <http://www.codeproject.com/KB/dotnet/methodlogger.aspx>, retrieved Jun. 10, 2011, 5 pages.
Richter, Jeffrey, "Garbage Collectionâ: *Automatic Memory Management in the Microsoft .NET Framework*" MSDN Magazine, Nov. 2000, [online], <http://msdn.microsoft.com/en-us/magazine/bb985010,aspx>, retrieved Jun. 10, 2011, 8 pages.
Richter, Jeffrey, "*Garbage Collection, Automatic Memory Management in the Microsoft .NET Framework*," MSDN Magazine, Nov. 2000, [online], <URL: http://msdn.microsoft.com/en-us/magazine/bb985010.aspx>, retrieved Jul. 13, 2011, 8 pages.
Keserovic, Sonja, et al., "An Overview of Managed/Unmanaged Code Interoperability," Oct. 2003, [online], <http://msdn.microsoft.com/en-us/library/ms973872.aspx>, retrieved Jun. 10, 2011, 11 pages.
Kommalapati, Hanu, and Tom Christian, "*JIT and Run: Drill Into .NET Framework Internals to See How the CLR Creates Runtime Objects*," May 2005, [online], <http://msdn.microsoft.com/en-us/magazine/cc163791.aspx>, retrieved Jun. 10, 2011, 16 pages.
Mikunov, Aleksandr, "*.NET Internals: Rewrite MSIL Code on the Fly with the .NET Framework Profiling API*," MSDN Magazine, Sep. 2003, [online], <http://msdn.microsoft.com/en-us/magazine/cc188743(printer).aspx>,, retrieved Jun. 10, 2011, 18 pages.
Elmalki, Ziad, "*MSIL Injection: Rewrite a non dynamic method at runtime*," [online], Mar. 29, 2009, <http://blogs.msdn.com/b/zelmalki/archive/2009/03/29/msil-injection-rewrite-a-non-dynamic-method-at-runtime.aspx>, retrieved Jun. 10, 2011, 6 pages.
Mutel, Alexandre, ".NetAsm: *A JIT Native Code Injection Library*," Jul. 25, 2008, [online], <http://netasm.codeplex.com/>, retrieved May 31, 2011, 3 pages.
Pistelli, Daniel, ".NET Internals and Code Injection," 2008, [online], <http://ntcore.com/files/netint_injection.htm>, retrieved Jun. 10, 2011, 37 pages.

(56) References Cited

OTHER PUBLICATIONS

Pistelli, Daniel, ".NET Internals and Native Compiling," [online], 2008, <http://ntcore.com/files/netint_native.htm>, retrieved Jun. 10, 2011, 30 pages.
Metula, Erez, ".NET Framework Rootkits," 2008, [online], <http://www.applicationsecurity.co.il/english/NETFrameworkRootkits/tabid/161/Default.aspx>, retrieved Jun. 10, 2011, 3 pages.
Microsoft Corp., "Ngen.exe (*Native Image Generator*)," 2010, [online], <http://msdn.microsoft.com/en-us/library/6t9t5wcf.aspx>, Jun. 10, 2011, 15 pages.
Corney, Diane, and John Gough, "*PE-file Reader Writer API (PERWAPI)*," Feb. 7, 2010, [online], <http://perwapi.codeplex.com/>, retrieved Jun. 10, 2011, 1 page.
Broman, David, "*Profiler stack walking: Basics and beyond*," Oct. 6, 2005, [online], <http://blogs.msdn.com/b/davbr/archive/2005/10/06/profiler-stack-walking-basics-and-beyond.aspx>, retrieved Jun. 10, 2011, 8 pages.
Microsoft Corp.,"Profiling Overview," [online], <http://msdn.microsoft.com/en-us/library/bb384493(d=printer).aspx>, retrieved Jun. 10, 2011, 9 pages.
"PurifyPlus." IBM Software, [online], <http://www.01.ibm.com/software/awdtools/purityplus/>, retrieved Jun. 10, 2011, 1 page.
Havin, Victor, and Raj Kesarapalli, "*Runtime analysis of ASP.NET Web services with Rational PurifyPlus*," Nov. 24, 2003, [online], <http://www.ibm.com/developerworks/rational/library/972.html>, retrieved Jun. 10, 2011 8 pages.
Cabral, Bruno, et al., "*Runtime Assembly Instrumentation Library*," Jan. 2005, [online], <http://rail.dei.uc.pt/>, retrieved Jun. 10, 2011, 1 page.
Cabral, Bruno, Paulo Marques, and Luis Silva, "*RAIL: Code Instrumentation for .NET*," Proceedings of the 2005 ACM Symposium on *Applied Computing*, 2005, [Online], <http://rail.dei.uc.pt/files/2005_sac2005.pdf>, retrieved Jun. 10, 2011, 6 pages.
Pistelli, Daniel, "Rebel.NET," 2008, [online], RAIL <http://ntcore.com/rebelnet.php>, retrieved Jun. 10, 2011, 2 pages.
Metula, Erez, "*Managed Code Rootkits: Hooking into Runtime Environments*," Apr. 23, 2010, [online], <http://www.appsec.co.il/en/system/files/Managed%20Code%20Rootkits%20presentation%20%28SOURCE%202010%29.pdf>, retrieved Jun. 10, 2011, 45 pages.
Prevx, CCHECKER.EXE, Feb. 28, 2008, [online], http://www.prevx.com/filenames/2901065454801649092-X1/CCHECKER.EXE.html>, retrieved May 31, 2011, 2 pages.
Metula, Erez, "*Penetration Testing*: [Tool] *ReFrameworker 1.1*," Seclists.Org, Apr. 19, 2010, [online], <http://seclists.org/pen-test/2010/Apr/36>, retrieved May 31, 2011, 2 pages.
"*SQL Injection*," Aqtronix, Aug. 2, 2002, [online], http://www.aqtronix.com/?PageID=98http://www.aqtronix.com/?PageID=98, retrieved Oct. 25, 2011, 2 pages.
"*OWASP, The Open Web Application Security Project*," 2010, [online], https://www.owasp.org/index.php/Category:OWASP_ModSecurity_Core_Rule_Set_Project, retrieved Oct. 25, 2011, 3 pages.
Nasiml, "*CommonUrlScan Scenarios*," IIS, Jun. 24, 2008 [online], http://learn.iis.net/page.aspx/476/common-urlscan-scenarios/>, retrieved Oct. 26, 2011, 7 pages.
"perldoc.per.org, *Perl Programming Documentation*," perlsec Perl 5 version 14.1 documentation, [online], <http://perldoc.perl.org/perlsec.html#Taint-mode>, retrieved Oct. 26, 2011, 7 pages.
"*ThreadStatic, CallContext and HttpContext in ASP.Net*," Cup(of T), Nov. 2, 2005, [online], http://piers7.blogspot.com/2005/11/threadstatic-callcontext-and_02.html>, retrieved Oct. 26, 2011, 9 pages.
Pistelli, Daniel, "*Rebel.Net Guide*," 2008, [online], http://www.ntcore.com/files/rebelnet.htm, retrieved May 31, 2011, 8 pages.

\* cited by examiner

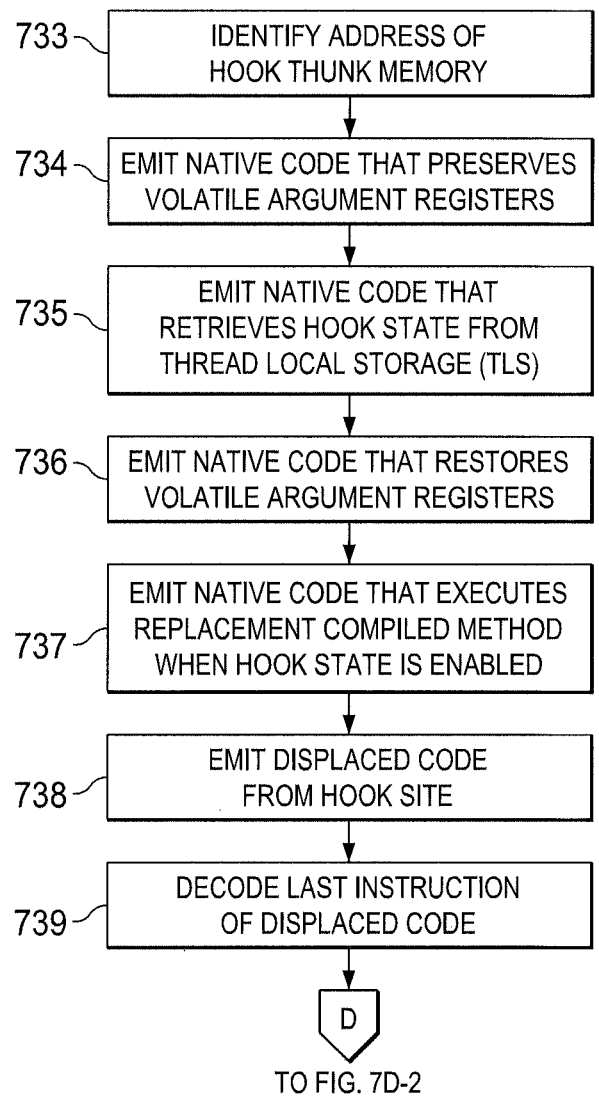

RUN-TIME INTERCEPTION OF SOFTWARE METHODS

TECHNICAL FIELD

The present disclosure relates to modifying software, and more particularly, to run-time interception of software methods by hooking native code.

BACKGROUND

Since its release in 2002, the Microsoft .NET Framework has become one of the most popular frameworks targeted by developers of Microsoft Windows-based applications. This widespread prevalence ensures that code targeting the .NET Framework will be run in diverse environments by a wide variety of users. Many of those users, particularly at the enterprise level, may have special demands for customizations and enhancements that were not anticipated in the design of the .NET Framework and are not provided by components or platforms built on it. In many cases, third-party software products must meet such needs with hooking—a generic term for technologies that alter or augment the behavior of other software. Hooking is often accomplished by modifying existing code or modifying data structures that influence code execution.

In the execution environment of the .NET Framework, however, most code and data are essentially maintained as part of the internal state of the framework's application virtual machine. The virtual machine accepts platform-agnostic bytecode as input, and both the bytecode and the metadata that describes it are represented in a standardized format. Internally, the bytecode is passed to a just-in-time (JIT) compiler to be translated into platform-specific native code. The virtual machine maintains internal data structures that describe this native code, and both code and data are stored at dynamic locations in memory belonging to the virtual machine. In general, neither the native code nor the associated data is directly exposed to third-party code.

Most hooking solutions for the .NET Framework have focused on modifying bytecode rather than native code. Some solutions alter the bytecode of .NET executables (known as assemblies), either on disk before they are accessed or in memory at load time. Another common technique is to use the .NET profiling API to edit bytecode before it is JIT compiled and executed by the virtual machine for the first time.

SUMMARY

The present disclosure involves systems and computer-implemented methods for installing software hooks. One process includes identifying a target method and a hook code, where the hook code is to execute instead of at least a portion of the target method, and wherein the target method and the hook code are executed within a managed code environment. A compiled version of the target method and a compiled version of the hook code are located in memory, where the compiled versions of the target method and the hook code are compiled in native code. Then, the compiled version of the target method is modified to direct execution of at least a portion of the compiled version of the target method to the compiled version of the hook code. The non-compiled version of the target method may be originally stored as bytecode. The managed code environment may comprise a managed .NET environment.

While generally described as computer implemented software embodied on non-transitory, tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
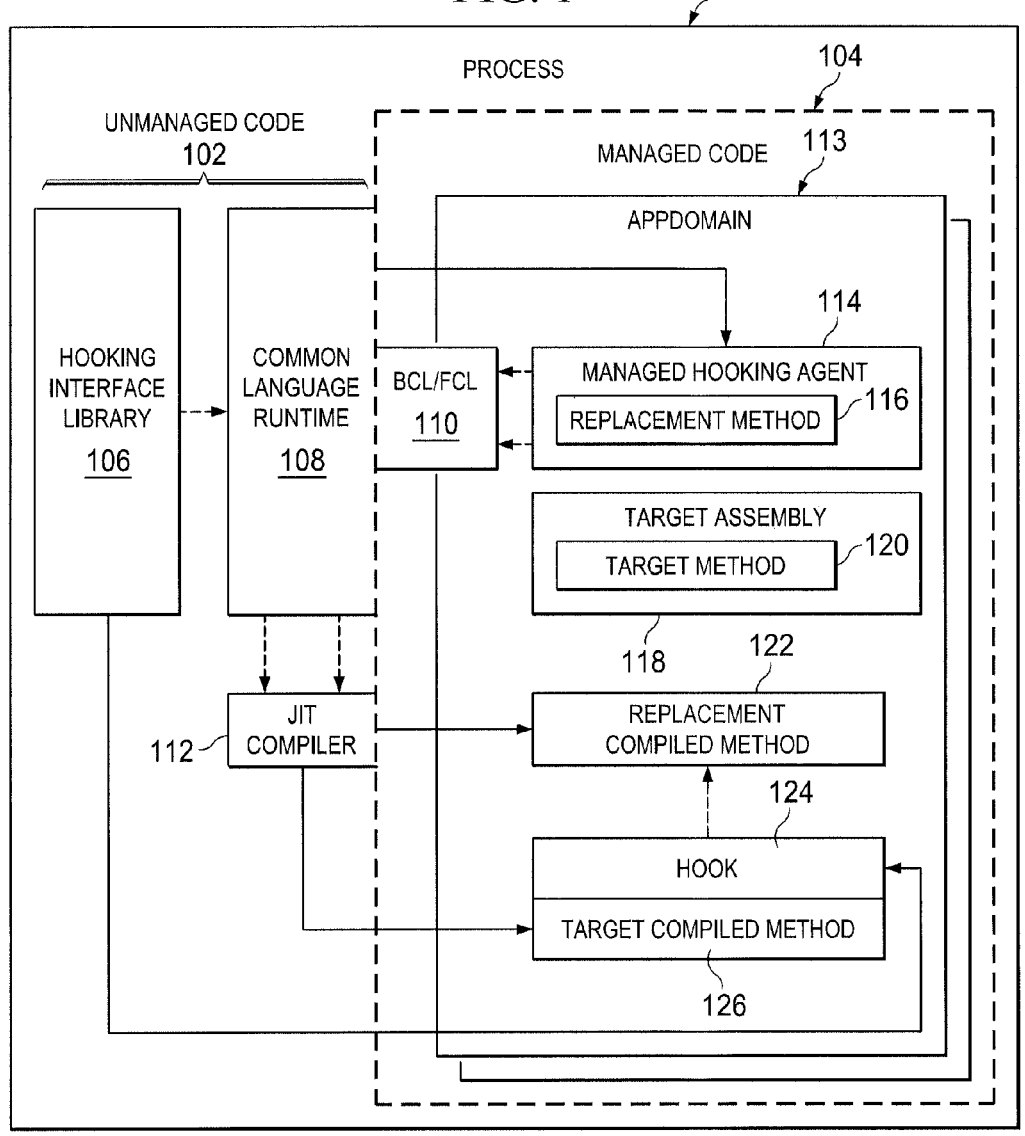
FIG. 1 illustrates an example process hosting an instance of the .NET Framework in an example implementation of the present disclosure.

The present disclosure describes computer systems, software, and computer-implemented methods for installing and using software hooks into code that targets the Microsoft .NET Framework. Generally, the systems and methods are intended for use in general-purpose and/or specific hooking solutions, where "hooking" refers to software techniques for altering or augmenting the behavior of other software. The utility of hooking is well established in the software industry, and is used for such purposes as software development (e.g., debugging, tracing, and performance analysis), computer security (e.g., monitoring and filtering program behavior to prevent unauthorized access), and extension, enhancement, and modification of existing functionality. The method of the present disclosure can be considered to operate in several operations, including (1) ensuring that native code exists for the target method and the hook (or replacement) method, forcing the native code to be generated by a just-in-time (JIT)

compiler, as necessary; (2) locating the native code of the compiled target and hook methods in memory; (3) hooking the compiled target method to redirect execution to the compiled hook method; and (4) providing facilities by which the hook method can invoke the original target method. Many variations and alternative implementations are possible. For example, the hook method may be originally implemented in native code (as opposed to managed code). Additionally, there may be multiple hook methods (i.e., both a pre-filter hook method and a post-filter hook method), or there may not be a distinct hook method. Further, it may not be necessary for the hook method to invoke the original target method.

An example glossary of select terms used in the present disclosure is provided herein:

ahead-of-time compilation or AOT compilation: See NGen.

assembly: A collection of one or more .NET modules. An assembly constitutes the fundamental deployable program element—application or library—in the .NET Framework. Not to be confused with assembly language, which is the lowest-level, human-readable programming language intended for translation into machine code.

Base Class Library or BCL: Set of assemblies included in the .NET Framework that implements a standard collection of types organized under the System namespace, essentially constituting an Application Programming Interface (API) to be used by other .NET assemblies. The BCL offers a subset of the functionality present in the Framework Class Library.

bytecode: A binary (or machine-readable, as opposed to human-readable) representation of managed code instructions to be executed in a managed code environment. Unless otherwise noted, refers to bytecode of the .NET Framework, which can be textually represented in Intermediate Language.

Common Intermediate Language or CIL: See Intermediate Language.

Common Language Runtime or CLR: Name for Microsoft's commercial implementation of the Common Language Infrastructure (CLI) standard.

compiled method: Term used herein to refer to native code implementing a method, having an entry point and, for example, typically comprising a prolog, a method body, and at least one epilog. Such native code could be generated at runtime by JIT compilation, or between product installation and load time by ahead-of-time compilation, or it could exist as part of the .NET Framework in the case of an internalcall or runtime method. As used herein, the term explicitly excludes a method's bytecode, even though managed languages such as C# technically are "compiled" to bytecode.

entry point: Generally, the address of the first operative native code instruction of a compiled method. A method is called (or invoked) by directing execution to the method's entry point.

epilog: Native code positioned at each of a compiled method's exits (i.e., returns and tail calls) that restores the state of the stack and nonvolatile registers. A sufficiently simple method's epilog may consist only of the instruction or instructions necessary to exit the method, assuming that optimizations were enabled at the time the method's native code was generated. Compare to prolog and method body.

Framework Class Library or FCL: Comprises the set of assemblies included in the .NET Framework. The Base Class Library is a subset of the FCL.

hook: A hook is a small modification to memory that redirects execution, especially a modification to code or to a pointer to code. To hook code is to modify that code, or some means by which the code is reached, in order to cause execution destined for that code to be redirected. Sometimes referred to as instrumenting or instrumentation.

inline: To inline a method in the .NET Framework is to JIT compile it as native code integrated directly into the native code of the calling method rather than as a separate compiled method Inlining allows the JIT compiler to institute a number of optimizations, including omission of the call instruction, return instruction, and prolog and epilog code. Inlining of a method happens separately for each caller of the method that is JIT compiled, based in each case upon the characteristics of the caller's code at the call site (e.g., a method is more likely to be inlined if it is called from within a loop) and the characteristics of the method itself (e.g., smaller methods are generally more likely to be inlined).

install (a hook): To effect the modification to memory that constitutes a hook. Not to be confused with the process of loading and setting up a software product on a system that is also called installation.

instance method: A method that can only be invoked in conjunction with an instance of a class that implements the method. A reference to that class instance is implicitly passed to the method as a parameter (accessed in C# via the keyword this). Compare to static method.

instrument, instrumentation: See hook, hooking.

Intermediate Language or IL: Human-readable representation of .NET bytecode instructions, analogous to assembly language as a human-readable representation of machine code instructions.

internalcall: Attribute of a method denoting that the method is implemented in the .NET Framework as native code rather than as bytecode. The method can nonetheless be called from managed code. Compare to runtime (attribute).

invoke: To invoke a method is to call it—in other words, to cause it to be executed.

JIT: To JIT (or JIT compile) a method is to compile its constituent bytecode into native machine code instructions. Subsequent invocations of the method will be directed to execute the resulting native code. See JIT compiler.

Just-In-Time compiler or JIT compiler: A component of a managed code environment that compiles (translates) bytecode into native machine code instructions. JIT compilation is often performed on a per-method basis, which imposes a one-time cost when the method is first invoked, but benefits performance on subsequent invocations because native code executes more quickly than does the interpretation of bytecode. JIT compilation also has a memory cost associated with retaining the resultant native code in memory.

machine code: See native code.

managed code environment: A platform comprising a virtual machine to interpret bytecode, and/or a JIT compiler to compile bytecode into native code, that executes managed code and provides it with the expected run-time environment (such as system libraries implementing an Application Programming Interface).

method: A function or subroutine associated with a particular type. Under the .NET Framework, all functions must be methods—that is, every function must be associated with a type. See instance method and static method.

method body: The operational portion (and usually the majority) of a compiled method's code, often preceded by a prolog and accompanied by epilog code at each of the method's exits (i.e., returns and tail calls). Although execution may be directed to various stubs based on which caller is invoking a method, execution will eventually reach the method body. Compare to stub, prolog, and epilog.

Microsoft Intermediate Language or MSIL: See Intermediate Language.

Microsoft .NET Framework: See .NET Framework.

module: See .NET module. (To avoid ambiguity, the term ".NET module" is used instead of simply "module" to refer to a module in the context of the .NET Framework.)

native code: A sequence of one or more machine code instructions, each instruction consisting of one or more bytes, that represent operations to be performed by a physical CPU recognizing the instruction set architecture according to which the instructions are encoded. In contrast, bytecode is interpreted by a virtual machine—essentially a software-realized CPU—or is compiled to native code by a JIT compiler for subsequent execution by a physical CPU, but cannot itself be directly executed by a physical CPU.

native image: An executable image, comprising native code generated by the NGen utility and stored on disk, that can be loaded in place of a .NET assembly. Use of a native image offers a number of performance benefits, such as obviating the need to load, verify, and JIT compile an assembly's bytecode.

.NET Framework: As used herein, refers to the Microsoft .NET Framework managed code execution environment, which comprises the Common Language Runtime (CLR) and the Framework Class Library (FCL).

.NET module: A library file containing .NET bytecode, type definitions, metadata, and any related data. One or more modules compose an assembly.

NGen: A utility included with the .NET Framework that generates a native image from an assembly. To NGen an assembly is to generate a native image from its contents. Also referred to as ahead-of-time compilation.

prolog: Native code prefacing a compiled method (i.e., code located at or near the compiled method's entry point) that performs initial preparations, such as establishing a stack frame for the function (including allocating stack space and preserving nonvolatile registers) and setting up an exception handler registration under certain CPU architectures. A method can be JIT compiled without any prolog, assuming optimizations are enabled. Compare to method body and epilog.

runtime (attribute): When appearing as an identifier, denotes that a method's implementation is provided by .NET at runtime, usually as native code implemented in the .NET Framework itself. Compare to internalcall.

static method: A method that is not invoked with an implicit reference to an instance of a type. (In C#, this means that a static method is not allowed to use the this keyword.) Compare to instance method.

stub: See thunk.

thunk: A sequence of native code executed before a compiled method when the method is invoked, for the purpose of preparing to execute the method, which may include JIT compiling the method upon its first invocation. Sometimes referred to as a stub or trampoline.

trampoline: See thunk.

Prior hooking solutions, such as those which modify bytecode, face many disadvantages. For example, due to the JIT compilation step, bytecode modification is only effective if performed before the code is JIT compiled, and the modification cannot be reversed once the code has been compiled. Consequently, hooks based on bytecode modification generally must be installed early in the lifetime of the target process and cannot be subsequently removed and reinstalled. In the case of precompiled code, bytecode modification is only effective if the precompiled code can be prevented from loading, which is not possible for some significant portions of code implemented as part of the .NET Framework itself. Altering assemblies can cause integrity checking to fail, while using the .NET profiling API may impact performance and is not recommended by Microsoft for production environments. Thus, there is a need for a more powerful, more flexible, and lighter-weight approach to hooking code that targets the .NET Framework as described in the systems and methods of the present disclosure. To answer that need, the systems and methods described herein enable a third-party software developer to alter the behavior of managed code in ways that are already well established for unmanaged code.

Previous techniques used to accomplish software hooking are usually specific to a particular execution environment—in other words, the means of performing hooking must be tailored to the specific platform hosting the code to be hooked. Managed code environments such as the Oracle (formerly Sun Microsystems) Java Runtime Environment and the Microsoft .NET Framework present special challenges for hooking solutions, since in these environments, the target code usually exists either as managed instructions (represented as bytecode) to be interpreted by a virtual machine, or as native code generated from bytecode at a dynamic time and memory address by a JIT compiler. Bytecode instructions are deliberately restricted in their ability to influence the execution state of the virtual machine. For instance, a branch instruction in bytecode cannot redirect execution to an arbitrary memory address, whereas a branch instruction in native code could do so. Bytecode also does not contain embedded function pointers that can be manipulated—one bytecode method can invoke another only by name or token, which the execution environment translates into pointers internally at runtime.

Most attempts to provide hooking under the .NET Framework have therefore focused on manipulating the bytecode of managed methods, either on disk, at load time, or at runtime, and among run-time solutions, use of the .NET Framework's Common Language Runtime profiling API is common. Such approaches sidestep the difficulties of locating and modifying the native code generated by JIT compilation of bytecode by acting on the bytecode itself, but they also face disadvantages. For one, a run-time hooking solution must be active in the process hosting the managed code of interest before that code is JIT compiled, or else the original, unmodified bytecode will be used as input to the JIT compiler. Generally speaking, the native code that the JIT compiler generates will thereafter execute whenever the managed code is invoked, and thus, altering the bytecode after that point is ineffective. Meanwhile, in the important cases of internalcall methods and native (NGen'ed) images, there is not even any bytecode to modify. In all cases, hooks instituted through the manipulation of bytecode have the further disadvantage that they cannot be removed at runtime.

The prevailing practice of using the .NET profiling API carries additional drawbacks, namely that only one profiler can be active in a given process; the profiler must be present and registered in a process of interest before the .NET Framework loads into the process, in order for the profiler to use instrumentation functionality; the profiling API is not recommended by Microsoft for use in production environments; and profiling necessarily has a greater performance impact than other approaches due to notification of many actions and events unrelated to the particular hooking objective. The presence of a profiler will prevent native images from being loaded (except for native images explicitly generated with profiling support), which avoids the difficulties associated with hooking a native image but comes at a further cost to performance. Methods implemented as internalcall, on the other hand, cannot be hooked at all using the profiling API. Similar disadvantages also apply to a less common, run-time approach that involves hooking the JIT compiler itself (specifically, its compileMethod function): the hook must be present before the managed code of interest is JIT compiled, and it is ineffective against native images and internalcall methods.

Another well-known approach to hooking .NET code is to modify the bytecode in a .NET assembly of interest on disk, and then ensure that the modified assembly is somehow loaded in place of the original at load time; the assembly could equivalently be modified in memory when it is loaded. One major drawback to such an approach is that it conflicts with the integrity checking step of .NET Framework's strong-name signing scheme, in cases where the assembly to be modified has a strong name and will be validated when it is loaded. Another drawback, specific to on-disk modification of assemblies, is that an altered assembly could be subsequently upgraded by the user, resulting in the hooking solution's modifications being overridden or the upgrades being ignored unless the solution actively maintains its replacement libraries. Substituting an assembly on disk or in memory could also interfere with, or be complicated by, the .NET Framework's loading of a corresponding native image generated from the original assembly.

Yet another documented approach involves modifying a type's data structures and metadata to override or replace its methods, rather than altering the code within the methods. Such an approach may insert a new class into the class hierarchy below or above the target class, so that its methods get invoked before or by the method implementation of interest, or it may modify the type's method table to replace a method implementation. Due to JIT compilation optimizations, however, such a solution could be partly ineffective if activated at runtime, as the JIT compiled code could contain hard-coded call and branch instructions that transfer execution to native code for some methods without accessing a method table, and thereby avoid the hooking solution's method table modifications. Another approach involves instantiation of a proxy class and substitution of it for instances of a target class, although such an approach could also be ineffective if JIT compiled code for the methods of the target class already exists in memory (or even if instances of the target class already exist), and it could face difficulties relating to inheritance and typecasting when instances of the proxy class are passed to other code.

The methods and systems of the present disclosure avoid these drawbacks by operating on the native code of the method of interest, whether that method was originally stored as bytecode, or as native code residing in a native image or existing as an internalcall implementation. For example, a method can be hooked, unhooked, and re-hooked at will, with the only recurring performance penalty being the cost of executing the replacement method. Because it eschews operating on bytecode in favor of modifying JIT compiled code, the described methods and systems are ideally suited for run-time operation and are not limited to installing hooks prior to JIT compilation. Furthermore, because all hooking is done at runtime, assembly replacement concerns such as strong name integrity checking and upgrade conflicts do not apply. And unlike most other run-time, .NET hooking solutions, the methods and systems do not rely on the .NET profiling API, so they are unrestricted as to when they must load into a process and how many instances can be simultaneously active in a process.

Given the widely-recognized utility and current pervasiveness of hooking, potential applications of the described systems and methods are numerous. A sampling of possible applications include: (1) third-party extensions to .NET system methods for security, reverse-engineering, or compatibility purposes; (2) lighter-weight, at-will profiling of .NET code; (3) enhancement of existing functionality, including "subclassing" of sealed types' methods; (4) transparent proxying of method calls; (5) enablement of aspect-oriented programming in the .NET Framework; and (6) implementation of bug fixes in .NET assemblies for which source code is unavailable.

FIG. 1 illustrates an example of a process 101 hosting an instance of the .NET Framework. In general, the process can be conceptually divided into a managed portion 104—the .NET Framework application virtual machine—where managed code that targets the .NET Framework executes, and an unmanaged portion 102 where code that does not target the .NET Framework executes. The Common Language Runtime (CLR) 108 implements the virtual machine and serves as a broker between the managed and unmanaged code. The CLR 108 exposes a Base Class Library (BCL) and/or a Framework Class Library (FCL) 110 to the managed code 104, where the BCL/FCL 110 comprises a set of objects and methods allowing the managed code to interact with the system.

In the illustrated example, a hooking system is implemented as an unmanaged hooking interface library 106 and a managed hooking agent assembly 114. In other implementations, however, the system may be implemented as any number of managed and/or unmanaged components. The hooking interface library 106 is used by extension code (not shown) that desires to hook a target method 120 implemented as managed code in a target .NET assembly 118. In other instances, any number of target methods may be hooked, and the hooking system and extension code need not be distinct entities. The hooking interface library 106 begins by using (as represented by the dashed arrow) functionality provided by the CLR 108 to load (as represented by the solid arrow) the managed hooking agent assembly 114 into one or more .NET application domains 113 (or "AppDomains"). The hooking interface library 106 can then communicate with the managed hooking agent 114 to prepare for hooking the target method 120. Operating from within the virtual machine, or managed code portion 104, the managed hooking agent 114 may use (as illustrated by the first pair of dashed arrows) functionality of the BCL/FCL 110 to request or force just-in-time (JIT) compilation of the target method 120 and a replacement method 116 implemented within the managed hooking agent 114 that will execute in place of the target method 120 once the hooking is complete. In other instances, the replacement method may be implemented as managed or unmanaged code separate from the managed hooking agent. The CLR 108, in turn, instructs (as represented by a second pair of dashed arrows) the JIT compiler 112 to perform the JIT compilation of the target method 120 and the replacement method 116, such that the JIT compiler produces (as represented by the two solid arrows from the JIT compiler 112) a JIT compiled replacement method 122 and a compiled target method 126.

In some instances, the hooking interface library 106 and/or the managed hooking agent 114 may then use various means and operations to determine the entry point address in memory of each of the target compiled method 126 and the replacement compiled method 122. The hooking interface library 106 can then store (as illustrated by the solid line from the hooking interface library 106) the hook code 124 at or near the entry point of the target compiled method 126, where the hook code 124 diverts execution (as represented by the dashed line leaving the hook code 124) from the target compiled method 126 to the replacement compiled method 122. Alternatively, the hook code 124 may be stored by the managed hooking agent 114. In other instances, the hook code 124 may instead divert execution to intermediate code that may execute any amount of other code, including the original code of the target compiled method 126 itself. In some instances, the replacement compiled method 122 may represent an extension to the target compiled method 126 performed prior to execution of the target compiled method 126, such that completion of the replacement compiled method 122 results in execution of the target compiled method 126. In some instances, the hook code could be included inside the target compiled method 126, such that some of the operations of the target method may be performed, with the completion of the replacement method resulting in completing the additional portions of the target method 120, although some difficulties may arise.

In some implementations, the managed hooking agent 114 may be installed into a Global Assembly Cache (GAC). Installing the agent 114 into the GAC ensures that the agent's code will execute with full permissions, allowing managed code associated with the agent (such as replacement method 116) to perform reflection, interop, or any other suitable privileged actions or operations without issue. Alternatives means for providing full, or otherwise enhanced, permissions to the managed hooking agent 114 may also be possible.

Figure 2:
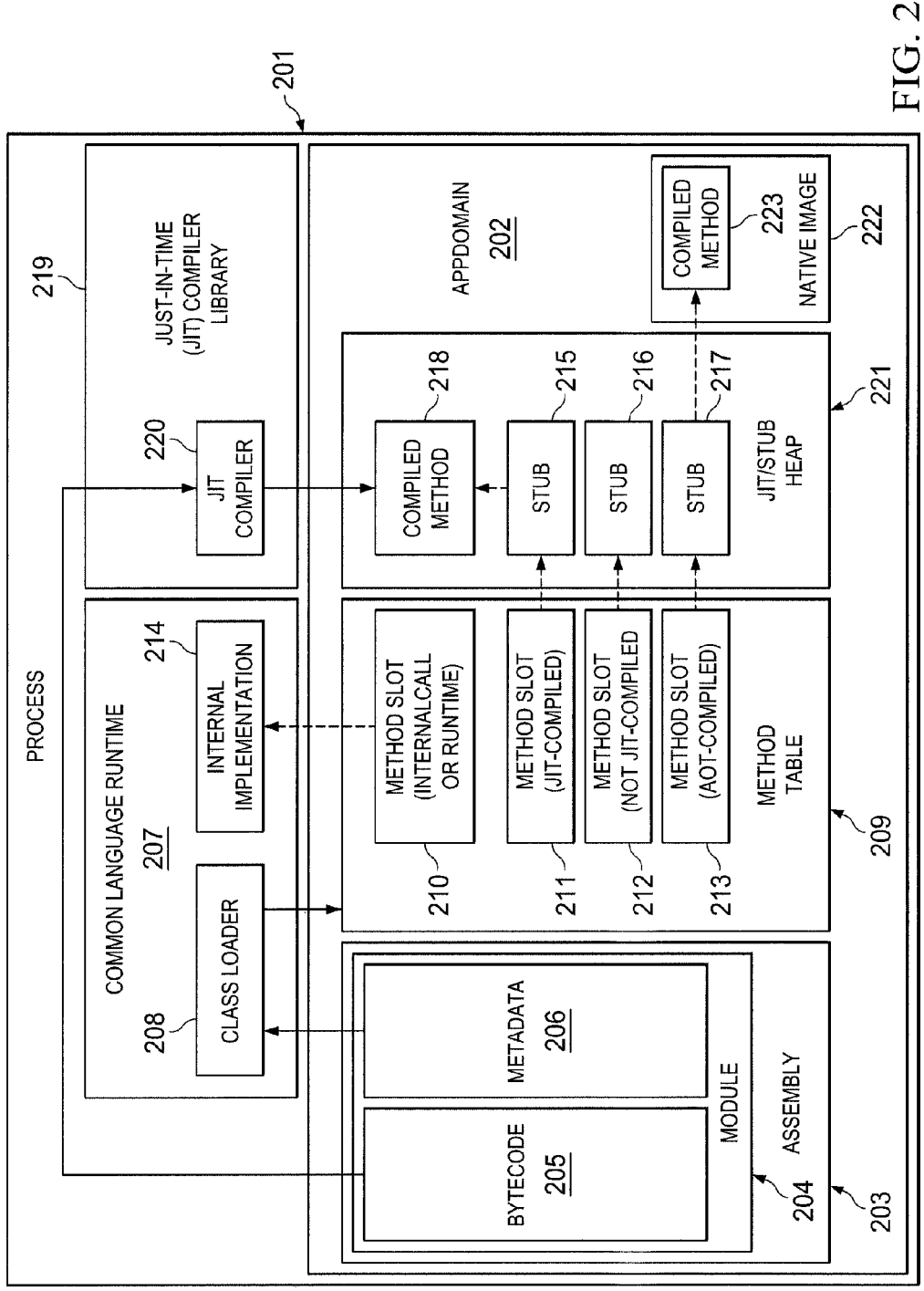
FIG. 2 illustrates an example .NET process, a selection of its relevant elements, and various relationships between those elements.

FIG. 2 illustrates an example .NET process 201, a selection of its relevant elements, and various relationships between those elements. It is understood that alternative implementations of .NET processes may be used, along with different combinations of elements. Further, various elements illustrated in FIG. 2 may be combined or separated into additional elements in other example processes, while additional elements not illustrated in FIG. 2 may be included.

Generally, process 201 is an example process hosting the .NET Framework. Although a process typically contains many different types of resources, diagram 200 only considers the process's memory. The rectangles represent entities present in the memory associated with process 201.

An example .NET application domain (or "AppDomain") 202 is illustrated within the process 201. The application domain 202 is an isolated environment in which a .NET application executes. Although only a single application domain is illustrated, a .NET process typically contains at least three application domains—a system domain, a shared domain, and a default domain. A more complex host, such as ASP.NET, may create additional application domains. Each application domain in a process could potentially contain its own instance of JIT compiled code for the target and/or replacement methods. Within the example application domain 202, the nesting of elements is understood to represent conceptual encapsulation rather than confinement to a particular memory region.

The application domain 202 includes an example .NET assembly 203. Generally, an assembly constitutes the fundamental deployable program element—an application or a library—in the .NET Framework, and comprises an assembly manifest (not shown) and one or more modules. An assembly may exist as one or more files loaded from local storage or accessed over a network. Here, the example assembly 203 is depicted as containing a single example .NET module 204. A module is a component of a .NET assembly that contains bytecode, type definitions, other metadata, and additional data such as strings and resources. For simplicity's sake, only the bytecode 205 and metadata 206 are illustrated in the example .NET module 204. The example bytecode 205 is an example common intermediate language (CIL) bytecode. Bytecode is a binary (machine-readable) encoding of platform-agnostic instructions executed by the .NET Framework's application virtual machine. A solid arrow represents that the bytecode 205 is passed as input to the Just-in-Time (JIT) compiler 220. Metadata is binary information that describes the types defined and code implemented in the module. Here, metadata 206 describes an example class (not shown) that is passed to the class loader 208 (as represented by the solid arrow). In addition to the class's name, visibility, fields, properties, events, attributes, base class, and interfaces implemented (not shown), the metadata 206 also describes methods implemented by the class and associates them with the corresponding bytecode.

The process 201 includes an instance of the Microsoft .NET Common Language Runtime (CLR) library 207, which may be named MSCORWKS.DLL, MSCORSVR.DLL, or CLR.DLL, depending on the system. The library 207 contains native code implementing the .NET Framework application virtual machine, including components such as the class loader 208 and native code implementations of internal methods of the .NET Framework, which are represented by a single example internal method implementation 214. Only one instance of the library 207 loads in each .NET process 201. The .NET Framework class loader 208 receives a type definition (not shown) described in the example metadata 206 and produces a method table 209, as represented by the solid arrow from the class loader 208.

The example method table 209 is created by the class loader 208 to describe a particular type (not shown). The method table 209 contains various data about the type, including various example method slots 210, 211, 212, and 213 (described below). The method table 209 provides a list of "slots" that contain pointers to stubs or compiled methods. Example method slot 210 is associated with an internalcall or runtime method, which is generally a method that is implemented in native code as part of the .NET Framework itself. In the example, the method corresponding to method slot 210 has an internal implementation 214 to which the method slot 210 contains a pointer, as represented by the dashed arrow. The example internal implementation 214 is depicted as a compiled function residing in the CLR library 207.

Method slot 211 is an example method slot for a JIT compiled method. In this instance, the method corresponding to the method slot 211 has already been JIT compiled to produce a compiled method 218. The method slot 211 is depicted as containing a pointer to a stub 215 that directs execution to the compiled method 218, as represented by the dashed arrow, although it should be noted that, in other cases, the method slot 211 could contain a pointer directly to the compiled method 218. In this example, the method slot 212 corresponds to a method that has not yet been JIT compiled, which means that no executable implementation of the method exists. Instead, the method slot 212 contains a pointer to a stub 216, as illustrated by the dashed arrow, that will initiate JIT compilation of the method the first time any attempt is made to invoke the method. After JIT compilation, the method slot 212 or stub 216 will be updated to point to the new compiled method. Method slot 213 is an example method slot for an ahead-of-time (AOT) compiled method. In some cases, bytecode may be compiled into native code and cached in permanent storage to improve run-time performance for all future executions of that code. In this example, the method slot 213 contains a pointer to a stub 217 (as illustrated by the dashed arrow) that directs execution to an AOT compiled method 223 existing in a native image 222.

The example JIT/stub heap 221 contains native code for both stubs and JIT compiled methods. In this example, the JIT/stub heap 221 is a region of executable memory in which native code instructions can be written and executed. The native code of a compiled method 218 and the native code for various stubs 215, 216, and 217 reside in the JIT/stub heap 221. In other instances, the JIT/stub heap 221 may be separated into a JIT heap and a stub heap, in which case the compiled method 218 would reside in the former while the stubs 215, 216, and 217 would reside in the latter. In the present example, compiled method 218 is an example just-in-time (JIT) compiled method. When a method (not shown) encoded in bytecode 205 is JIT compiled, the JIT compiler 220 generates a native code compiled method 218, as represented by the solid arrow. The compiled method 218 resides in the memory of the JIT/stub heap 221. Example stub 215 is an example stub for a JIT compiled method. The stub 215 resides in a JIT/stub heap 221 and comprises one or more native code instructions that direct execution to a particular compiled method 218. Stub 216 is an example stub for a method that has not been JIT compiled. The stub 216 receives execution whenever an attempt is made to execute a particular method (not shown), so that the method can be JIT compiled. The stub 216 resides in the JIT/stub heap 221 and comprises one or more native code instructions that initiate JIT compilation of the method, after which the stub 216 may be updated to instead direct execution to the new compiled method. Stub 217 is an example stub for an AOT compiled method. The stub 217 resides in a JIT/stub heap 221 and comprises one or more native code instructions that direct execution to a compiled method 223 within a native image 222. In some instances, any of the stubs 215, 216, or 217, as well as the compiled method 218 and/or native image 222, may be omitted.

The process 201 includes a Microsoft .NET Just-In-Time Compiler library 219, which may be named MSCORJIT.DLL or CLRJIT.DLL depending on the system, in which the .NET Framework houses its JIT compiler functionality 220. For a method (not shown) that is to be compiled into native code, the JIT compiler 220 receives bytecode—here, a portion of bytecode 205—as input and produces native code as output, such as the example compiled method 218 (as represented by the two solid arrows).

Returning to the AppDomain 202, an example native image 222 is illustrated. A native image is a .NET module that contains native code instead of, or in addition to, bytecode. A native image may be generated to improve run-time performance, by obviating the need to JIT compile code at runtime. The code of a native image is termed ahead-of-time (AOT) compiled. In this example, a native image 222 generated previously, for instance using the .NET Framework's NGen utility, and has been loaded into the process 201. Here, the native image 222 is depicted as containing a single compiled method 223, although in other instances, a native image may contain any number of compiled methods.

Figure 3:
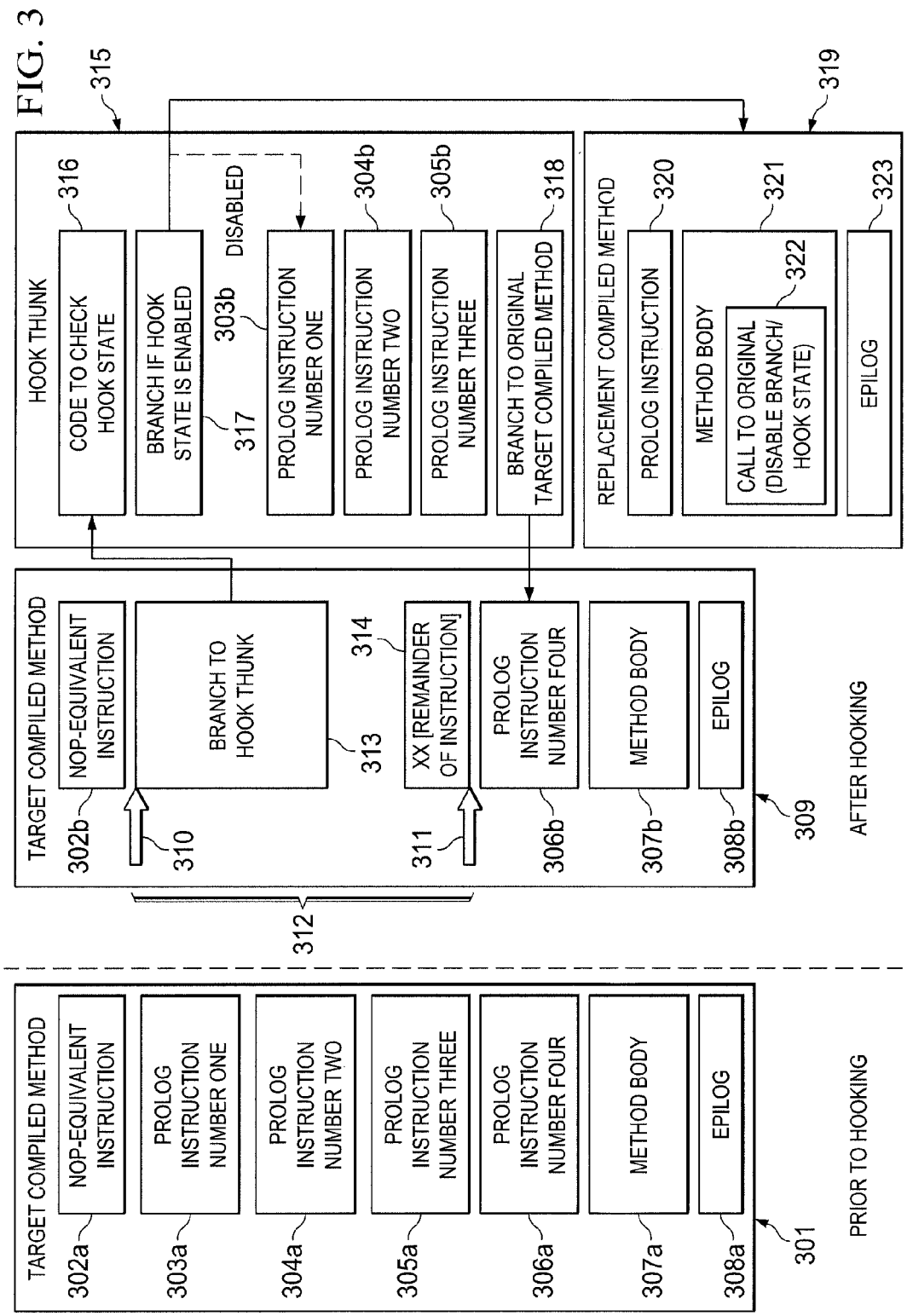
FIG. 3 is an example abstract depiction of a method before and after the installation of a software hook.

FIG. 3 is an example abstract depiction of a method before and after the installation of a software hook. The illustrated method is an example, such that alternative and additional components, instructions, and methods may be used in alternatives. In general, target compiled method 301 is an example compiled method created after a target method is compiled by a JIT compiler, and prior to the installation of a detour hook. The native code of an example compiled method 301, as it was originally generated by a compiler (JIT or otherwise), consists of an initial no-operation (NOP) or equivalent instruction 302a, followed by a prolog comprising instructions 303a, 304a, 305a, and 306a, followed by a method body 307a, and ending in an epilog 308a. In various instances, the target compiled method 301 may begin with any number of NOP-equivalent instructions and/or prolog instructions, or no such instructions. In various instances, the target compiled method 301 may lack a method body, or it may lack an epilog, or it may have any number of epilogs reached by various paths through the method body 307a. In some instances, the epilog 308a may be replaced by a tail call.

Example NOP-equivalent instruction 302a is illustrated in the target compiled method 301 prior to installation of the detour hook in the target compiled method 301. In some instances, a compiler may emit a NOP or equivalent instruction as the first instruction of a compiled method; however, in some instances, the true entry point of the compiled method may be located after the NOP-equivalent instruction 302a. In some instances, installing a method hook may purposely advance past any initial NOP-equivalent instructions in anticipation of the possibility of a second, true entry point after such instructions, as it would be unsafe to overwrite both the first and second entry point with a single detour hook. NOP-equivalent instruction 302b, on the other hand, is illustrated in the target compiled method 309 after installation of the detour hook. In this example, the initial NOP-equivalent instruction 302a is skipped and therefore persists as an unmodified NOP-equivalent instruction 302b in the hooked target compiled method 309.

Prior to hooking, a first instruction of prolog code 303a is illustrated in the target compiled method 301. In many cases, a compiled method begins with a prolog that may allocate stack space, preserve nonvolatile CPU registers, register an exception handler, and other operations. The first instruction of prolog code 303b is illustrated within a hook thunk 315, as relocated and possibly adjusted, after installation of the detour hook. The region of memory that originally held the prolog instructions 303a, 304a, and 305a is overwritten by the detour hook 313 during installation of the hook, so the instructions 303b, 304b, and 305b are relocated to another memory location and may be adjusted in the event that their operations or encodings are dependent on the address at which they execute. The instructions 303b, 304b, and 305b will then be executed at the new location prior to executing the unmodified remainder of the target compiled method 309, in the event that the replacement compiled method 319 must invoke the original target compiled method 309. Second, third, and fourth prolog instructions 304a, 305a, and 306a are illustrated prior to the installation of the detour hook, as well as after the installation of the detour hook as relocated and possibly adjusted second and third prolog instructions 304b and 305b in the hook thunk 315. In this example, the third prolog instruction 305a will not be fully overwritten by the detour hook, but the relocated prolog instruction 305b must nonetheless be copied in its entirety, as a partial instruction may not execute properly. The example fourth instruction of prolog code 306b (after installation of the detour hook) may be the first whole instruction after the region of memory that will be overwritten by the detour hook, meaning it will not be overwritten within the target compiled method 309. The fourth instruction of prolog code 306a is therefore persisted as an unmodified instruction 306b after installation of the hook.

Prior to installation of the detour hook, the target compiled method 301 includes an example method body 307a. The method body 307a constitutes the operational portion of the target compiled method's code. As the target compiled method 301 includes a prolog of sufficient size to be overwritten by the detour hook, the hooked target compiled method 309 thus retains the original, unmodified method body 307b after installation of the detour hook.

The target compiled method 301 includes example epilog code 308a. A compiled method may include an epilog at each of its exits that reverses the operations of the prolog, such as unregistering an exception handler, restoring nonvolatile CPU registers, and releasing allocated stack space, among others. As illustrated, the hooked target compiled method 309 retains the original, unmodified epilog 308b after installation of the detour hook.

As described, the target compiled method 309 illustrates the method after installation of detour hook. Arrow 310 represents an example start pointer demarcating the hook site 312 in the target compiled method 309. The start pointer 310 references the address at which the first byte of the hook site 312 begins. Arrow 311 is an example end pointer demarcating the hook site 312 in the target compiled method 309. The end pointer 311 references the address of the byte immediately following the last byte of the hook site 312. In this example, the start pointer 310 and end pointer 311 are computed by method 703 of FIG. 7B. The space between the start pointer 310 and end pointer 311 is the example hook site 312 in the target compiled method. The hook site 312 in the hooked target compiled method 309 is represented by a bracket to the left of the memory elements that fall within it. It begins at the start pointer 310 address and ends immediately prior to the end pointer 311 address. The hook site 312 must cover an integral number of whole instructions, and in the example CPU architectures considered here, an instruction may comprise multiple bytes. Thus, the hook site 312 may be some number of bytes larger than is necessary to hold the detour hook 313 that is written over its initial portion. In this example, the hook site 312 includes an example partial instruction 314. In the case where the hook site 312 is larger than the detour hook 313, some bytes at the end of the hook site 312 may not be overwritten. As a result, some partial instruction bytes 314 no longer representing executable code may remain. Execution will not reach these vestigial bytes, and therefore they are harmless.

Example detour hook 313 consists of native code that branches to the hook thunk 315. The target compiled method 609 is hooked by overwriting the initial portion of the hook site 312 with an instruction or instruction sequence 313 that transfers execution to a hook thunk 315, as represented by a solid arrow. Thus, whenever the hooked target compiled method 309 is invoked, the hook thunk 315 will execute instead.

The example hook thunk 315 consists of native code to conditionally execute either the original target compiled method 309 or a replacement compiled method 319 based on whether a hook state indicates that the hook is disabled or enabled, respectively. If the hook is disabled, the hook thunk 315 executes the instructions 303b, 304b, and 305b that were relocated from the hook site, before executing the unmodified remainder of the hooked target compiled method 309. To make the determination, example code 316 comprises native code to check the current hook state for this hook. In this example, the hook thunk 315 begins with code 316 that retrieves the contents of a thread-local storage (TLS) slot (or other suitable location) and checks a specific bit indicating the relevant hook state. With reference to other illustrations, the code 316 was emitted by method 705 at 735, 736, and 737. In some instances, the hook thunk 315 may be considered an intermediate layer of native code that executes between the hook 313 and a more developer-friendly replacement method or filter and is used to determine which operations and instructions to perform.

The hook thunk 315 contains an instruction or instruction sequence 317 that conditionally transfers execution to a replacement compiled method 319 if the hook is enabled, as represented by a solid arrow. Otherwise, execution continues to the instructions 303b, 304b, and 305b relocated from the hook site when the hook state is not enabled (as illustrated by the dashed arrow). The hook thunk 315 also includes an additional instruction or instructions 318 that transfer execution to the end pointer address immediately following the hook site 312. After the relocated instructions 303b, 304b, and 305b have been performed, the instructions 318 transfer execution to the next instruction 306b within the original, unmodified portion of the target compiled method 309, allowing the method 309 to perform its original function. As illustrated, the instructions 318 may use an indirect call, a relative call, a relative jump, or a return jump to return to the associated target compiled method 309.

In the after hooking illustration, an example replacement compiled method 319 is illustrated. A primary purpose of the detour hook 313 and hook thunk 315 is to arrange for the replacement compiled method 319 to execute in place of a target compiled method 309 whenever the latter is invoked. A secondary purpose of the hook thunk 315 is to provide a means by which the replacement method 319 may execute the original target compiled method 309 as desired, as an alternative to completely reimplementing the target compiled method's functionality within the replacement method 319. However, in other instances a hook thunk may not exist, or it may enable a replacement method to execute the target compiled method's original functionality through other means, such as by supplying the replacement method with an appropriate delegate or pointer. Where the hook thunk 315 does not exist, the detour hook 313 may transfer execution directly to an identified replacement method, where, in some instances, the replacement method can optionally execute one or more of the instructions in the target compiled method 309 overwritten by the detour hook 313. In those instances, the replacement method may determine, using one or more global or instance-based variables within the system (i.e., a variable indicating a particular hook state or where the variable is used to accomplish execution, such as a delegate variable), whether the replacement instructions or original instructions are to be executed. As illustrated, the replacement compiled method 319 includes a prolog instruction 320, a method body 321, and an epilog instruction 323, although in various instances the replacement method 319 may consist of other sequences of instructions. As illustrated, the method body 321 includes an instruction 322 for calling the original target compiled method 309, where the call allows the hook state to be disabled after the instruction 322 is executed. In this manner, the replacement compiled method 319 may be executed once, and the original functionality executed thereafter.

The general format of a replacement method can be represented by the following C#-like pseudocode, although any suitable format would suffice:

```
        static ReturnType Hook_ImplementingTypeName_
    MethodName(
            ImplementingType thisPtr,
            Argument1Type arg1,
            ...)
    {
            // do pre-work
            ReturnType ret;
            DisableThisHook( );
            try
            {
                ret = thisPtr.MethodName(arg1, ...);
            }
            finally
            {
                EnableThisHook( );
            }
            // do post-work
            return ret;
    }
```

In this case, the hooked target compiled method 309 is an instance method, which the .NET Framework calls as though the this pointer is its first argument. The replacement method is therefore written as a static method that explicitly accepts the this pointer as its first argument. In the above example, the replacement method does some work, calls the original hooked method with its original arguments, and then does more work and returns the result of the hooked method, assuming no exception occurs. However, it should be clear that the replacement method could call the hooked method many times or not at all, with arbitrary arguments or any number of other changes made to the execution environment, among countless other variations.

If the hooked method is non-public, the replacement method may invoke it via reflection (for instance, using System.Type.InvokeMember or System.Reflection.MethodBase.Invoke). If the hooked method has a return value of a non-public type, or accepts arguments of a non-public type, the replacement method may have to replace such types in its declaration with an appropriate, publicly-accessible type, such as System.Object or System.IntPtr.

To apply generically to all methods, including constructors, the original method can be retrieved using System.Type.GetMember or GetMembers (rather than using GetConstructor or GetConstructors, as GetMethod and GetMethods will not return a constructor), and the resulting System.Reflection.MemberInfo object can be cast to a System.Reflection.MethodBase (from which both MethodInfo and ConstructorInfo derive) so that the Invoke method can be called with the original target object specified. Calling ConstructorInfo.Invoke, on the other hand, will instantiate a new object rather than allow reinitialization of an existing object.

As described previously, the detour hook 313 replaces native code maintained internally by the Common Language Runtime (CLR). Modifying JIT compiled code may cause garbage collection roots (CPU registers and local variables that the garbage collector examines for object references) to hold unexpected values when the modified code is executing. Thus, it is possible for the program's state to become corrupted if garbage collection occurs during execution of modified JIT compiled code. To avoid this problem, garbage collection may be delayed, or the behavior of the garbage collector may be otherwise modified by various means and as necessary. For instance, a hook of the Windows GetThreadContext API function can detect if garbage collection is occurring during execution of a detour hook such as detour hook 313, based on the instruction pointer in the thread context that GetThreadContext retrieves. In such a case, the GetThreadContext hook may modify the retrieved thread context or return an indication of failure to the garbage collector in a way that delays garbage collection. In another instance, a hook of the Windows SuspendThread API function may likewise delay garbage collection by returning an indication of failure without first invoking the original SuspendThread function. Garbage collection may also be delayed by setting the appropriate field of a .NET Thread object, among other alternatives.

It will be understood that the methods described in FIG. 3 may include additional, fewer, or alternative elements and instruction sets in different implementations. FIG. 3 is an example, and is not intended to be limiting.

Figure 4:
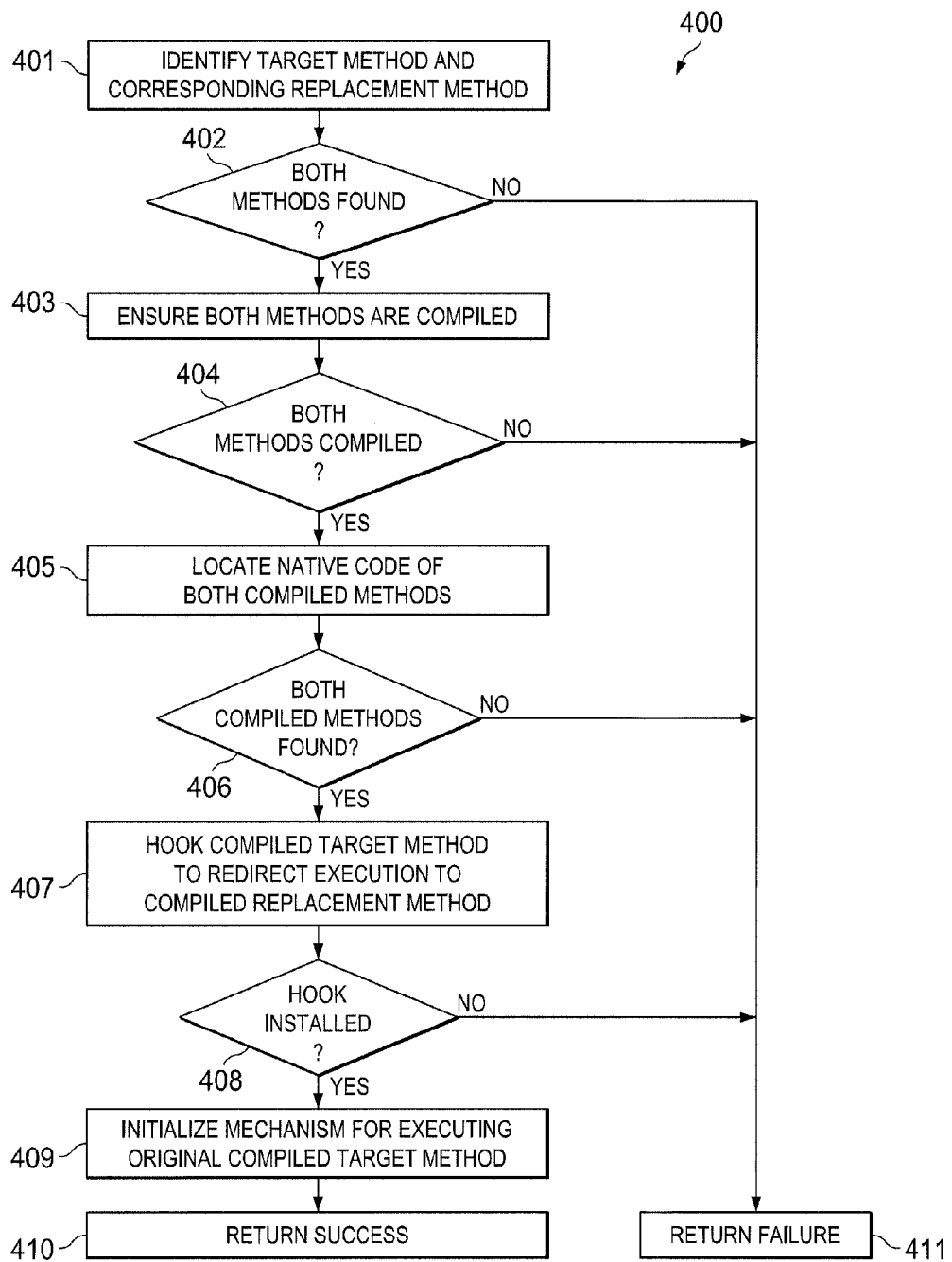
FIG. 4 is a flowchart of an example method for preparing a software hook and installing it into a target method in the .NET Framework.

FIG. 4 is a flowchart of an example method 400 for preparing a software hook and installing it into a target method within the .NET Framework. At 401, a target method to hook and a replacement method to execute in its place are identified. In some instances, the methods could be identified by name and/or signature, represented by System.Reflection.MethodBase objects, or method 400 may be hard-coded to operate on particular methods, among other alternatives. In some instances, the name and signature of the target and replacement methods may be received as input variables or other entries.

Figure 5A:
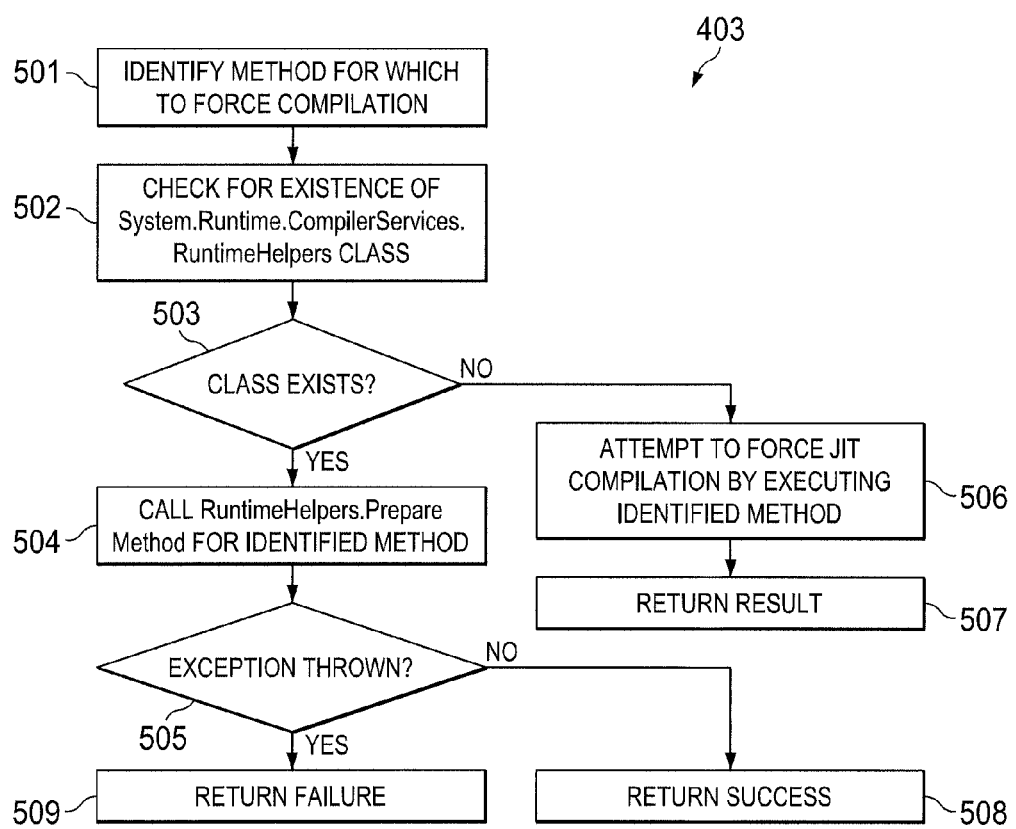
FIG. 5A is a flowchart of an example method for ensuring that native code exists for a particular target method, using two example techniques.
Figures 1, 5B:
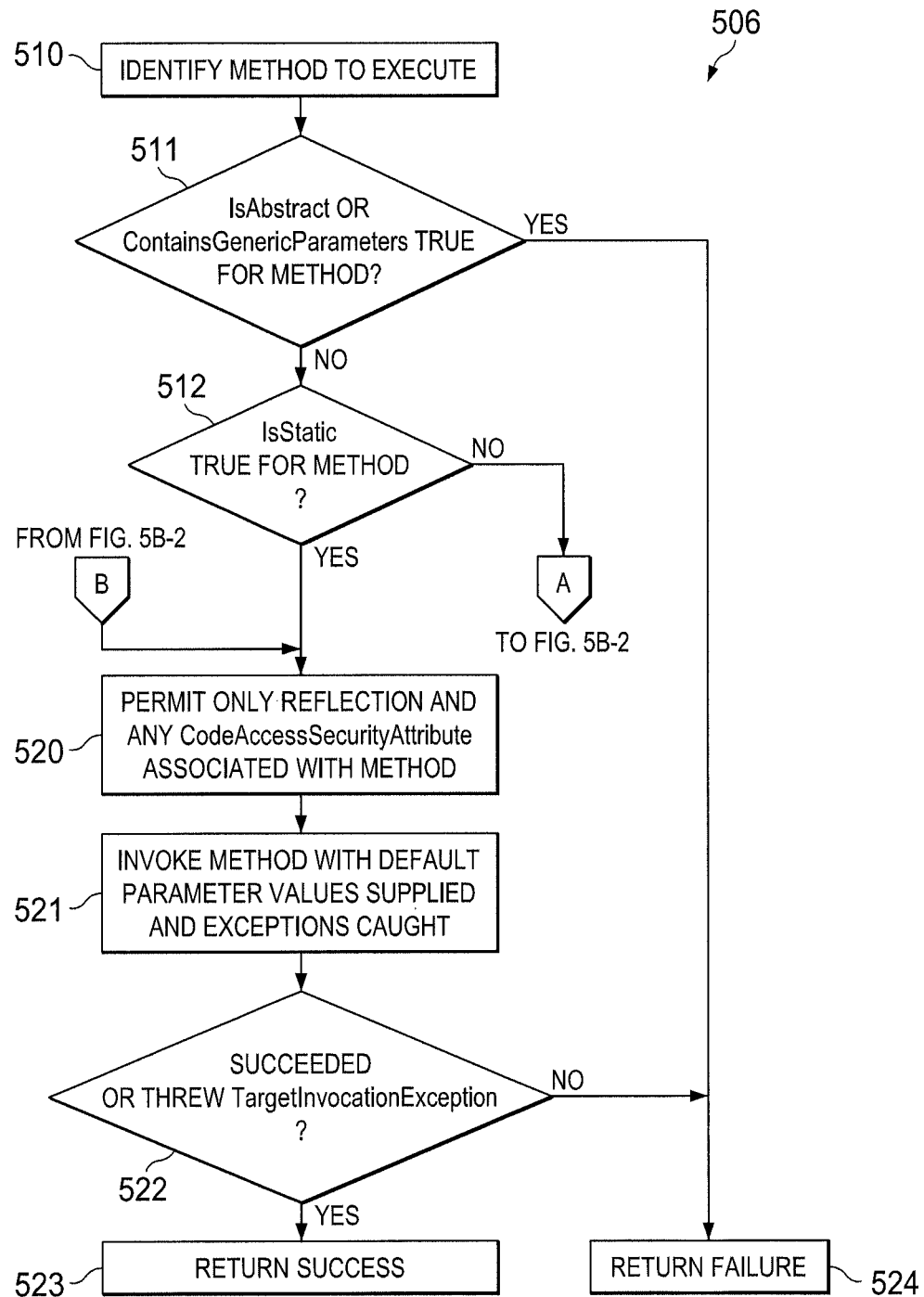
FIG. 5B is a flowchart of an example method of executing a particular target method sufficient to provoke just-in-time (JIT) compilation within the .NET Framework.
Figures 2, 5B:
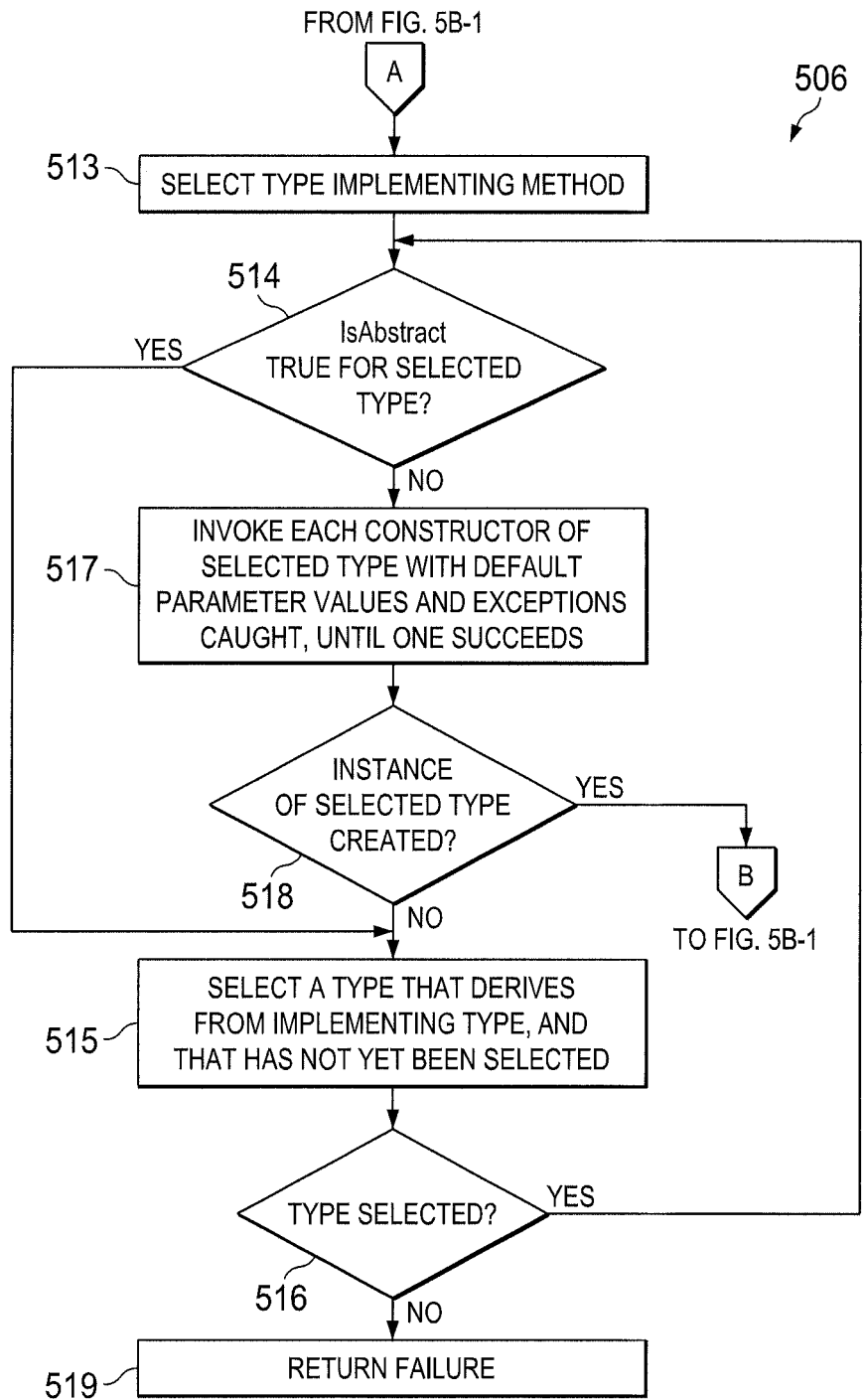

At 402, a determination is performed as to whether both methods are found. If both methods are found, method 400 continues at 403. If one or both of the methods cannot be found, method 400 moves to 411 where a failure notification or indication is returned. At 403, operations are performed to ensure that native code exists for both the target method and the replacement method, including forcing native code to be generated, as necessary. FIGS. 5A and 5B provide additional detail into this process.

At 404, a determination is made as to whether native code exists for both methods. If so, method 400 continues at 405. If native code does not exist and could not be generated for either method, method 400 continues at 411. At 405, the addresses in memory of the native code for both the target compiled method and the replacement compiled method are identified and located. Further explanation of this operation is provided in FIGS. 6A and 6B. At 406, a determination is made as to whether both compiled methods are found or located. If not, method 400 continues to 411. If both are found, method 400 moves to 407.

At 407, a software hook redirecting execution from the target compiled method to the replacement compiled method is installed. The software hook may be initialized and installed using, for example, the methods described in FIGS. 7A-7E. In some cases, the software hook may redirect execution to intermediate hook code, called a "hook thunk," that selectively executes one or more hook methods and may or may not execute the original target compiled method. At 408, a determination is made as to whether the software hook was properly installed. If not, method 400 continues at 411 to indicate the failure, but if properly installed, method 400 continues to 409. Causes of hook installation failure may include low physical or virtual memory conditions, the presence of code in the target compiled method that is incompatible with hooking, or a busy multithreaded environment that prevents thread-safe hooking in a timely fashion, among others. FIG. 7E provides an example method for safely installing the software hook in a multithreaded environment.

In many cases, a replacement method may want to observe calls to the target method and optionally modify the attendant behavior while still allowing the function of the target method to be performed. In such cases, it is generally preferable to execute the original target method, optionally with modified argument values or execution state, rather than reimplement its function in the replacement method. Thus, at 409, a mechanism is initialized by which the replacement compiled method may execute the original target compiled method, although it should be noted that such a mechanism need not exist in some instances and alternative implementations. At 410, an indication of successful installation is returned.

FIG. 5A is a flowchart of an example method 403 (corresponding to operation 403 of FIG. 4) for ensuring that native code exists for a particular target method. In the present instance, the existence of native code is ensured by forcing the .NET Framework to attempt just-in-time (JIT) compilation of the corresponding method.

At 501, a target or replacement method associated with the hook installation that is to be forced to compile is identified. In one instance, the particular method could be identified by name and signature, while in another, it could be represented by a System.Reflection.MethodBase object, among others. At 502, the operations check if the current version of the .NET Framework provides the System.Runtime.CompilerServices.RuntimeHelpers class, which can be used to initiate JIT compilation of an arbitrary method. The check can be performed by various means, such as by checking that the .NET Framework version is at least 2.0, or by attempting to access the RuntimeHelpers type by name via reflection, among others. At 503 a determination is made as to whether the RuntimeHelpers class was found. If found, method 403 continues at 504; otherwise, method 403 moves to 506 to try an alternative approach. However, in some cases it may be desirable to use the alternative approach even if the RuntimeHelpers class is found—for instance, in the case of a method of a value type for which an unboxing stub is created when JIT compilation is initiated using the alternative approach.

At 504, the PrepareMethod method of the RuntimeHelpers class is called with a handle representing the method identified at 501 supplied as an argument. The operations can use reflection to obtain a reference to the RuntimeHelpers type and invoke its PrepareMethod method, as statically referencing the RuntimeHelpers type would make the implementation incompatible with versions of the .NET Framework prior to version 2.0. The PrepareMethod method does not return any indication of success or failure, so it is assumed to have succeeded unless it throws an exception. If the call to PrepareMethod resulted in an exception, method 403 continues at 509 to indicate failure. If no exception occurred during the call, then method 403 continues at 508 to indicate success. If the alternative of 506 is used, an attempt to provoke JIT compilation of the method identified at 501 is made by invoking the identified method. An example invocation is illustrated and described in FIG. 5B. At 507, the result of the attempted invocation (success or failure) is returned.

FIG. 5B is a flowchart of an example method 506 of executing a particular target method sufficient to provoke just-in-time (JIT) compilation within the .NET Framework. At 510, a method to invoke is identified. In one instance, the method could be identified by name and signature, while in another instance, the method could be represented by a System.Reflection.MethodBase object, among other alternatives. In this example, the method is invoked using reflection.

At 511, a determination is made as to whether the method identified at 510 is sufficiently defined to allow it to be invoked. In this example, a System.Reflection.MethodBase object representing the method is obtained, and its IsAbstract and ContainsGenericParameters properties are consulted. If IsAbstract is true, the method is not implemented by the type of which it is a member (for instance, the type may be an abstract class or an interface). If ContainsGenericParameters is true, the method and/or the type of which it is a member contains one or more type parameters that have not been specified, and therefore the method cannot be invoked. (For compatibility with versions of the .NET Framework prior to version 2.0, it may be necessary to read the ContainsGenericParameters property using reflection, if it exists.) If either property is true, method 506 moves to 524 to indicate failure. If both properties are false, method 506 continues at 512.

At 512, a determination is made as to whether the method identified at 510 is an instance method or a static method. In this example, a System.Reflection.MethodBase object representing the method is obtained, and its IsStatic property is read. If the property is true, then the method is a static method, and method 506 moves to 520. Otherwise, the method is an instance method, so method 506 continues at 513 to perform additional steps necessary to enable invocation of the method. At 513, an initial selection is made of the type that implements the method identified at 510 (determined, for instance, by consulting the System.Reflection.MemberInfo.ReflectedType property of an object representing the method). Other types may be selected, so a data structure that tracks selected types may be initialized at 513 as well.

The operations of 514 constitute the beginning of a loop in method 506. At 514, a determination is made as to whether the currently selected type is an abstract type. In this example, the System.Type.IsAbstract property of an object representing the selected type is read. If IsAbstract is true, then the selected type is an abstract type and therefore cannot be instantiated, so method 506 continues at 515 where another iteration of the loop is performed. If IsAbstract is false, method 506 continues at 517.

At 515, an attempt is made to select a derived type of the implementing type initially identified at 513. To ensure that the type selected at 515 has not previously been selected, a data structure that tracks previously selected types may be consulted. In the event that every qualifying type has been selected previously, no type is selected. At 516, if a type was selected at 515, method 506 moves to 514 to perform another iteration of the loop. Otherwise, method 506 moves to 519 to indicate failure, as an instance method cannot be invoked without an instance of a type that implements it.

At 517, an attempt to instantiate the selected type is made by invoking one of its constructors. In one instance, default values such as null and zero may be supplied if the constructor accepts any arguments. In the event that invocation of the constructor fails or throws an exception, another constructor is invoked, until either a constructor succeeds or all constructors have been invoked and failed. A successful invocation of a constructor creates an instance of the selected type. At 518, a determination is made as to whether an instance of the selected type is created. If an instance of the currently selected type was created, method 506 moves to 520; otherwise, method 506 moves to 515 to perform another iteration of the loop. At 519, an indication that the instance method identified at 510 could not be invoked is returned, as no instance of the implementing type or a derived type could be created. In some cases, it may be desirable to programmatically generate and instantiate a derived type of the type identified at 513 using reflection—for instance, if the type identified at 513 is abstract and no suitable derived type is created in the loop of method 506.

At 520, all code access security permissions except for reflection and any declarative security demands that must be satisfied to invoke the method are explicitly denied. Denying security permissions prior to the invocation reduces the chance that execution of the method will result in side effects.

Reflection permission, however, is not denied, as it may be needed to invoke the method in some instances. At 521, the method identified at 510 is invoked using reflection. If the method is an instance method, the type instance created at 517 is specified as the target object. In one instance, default values such as null and zero may be supplied if the method accepts any arguments. As the goal is to provoke JIT compilation of the method while minimizing the incidence of side effects, it is sufficient for execution of the method to begin only; it does not need to complete. Denying code access security permissions at 520 and passing null argument values increases the chance that execution of the method, once it begins, will subsequently return quickly or throw an exception, but in any case, the method will have been JIT compiled. At 522, a determination is made as to whether the invocation and/or compiling succeeded or not. If invocation succeeded (which is to say that System.Reflection.MethodBase.Invoke, for instance, succeeded, not that the invoked method necessarily succeeded), or if invocation resulted in an exception indicating that the invoked method itself threw an exception after commencing execution (for instance, an exception of type System.Reflection.TargetInvocationException), then the method identified at 510 is assumed to have executed and is therefore JIT compiled. In this case, method 506 continues at 523 to indicate success. If invocation failed or threw an exception that does not suggest that the method executed at all, then method 506 moves to 524 to indicate failure. At 523, an indication that execution of the method identified at 510 was successfully initiated is returned, meaning the method has been JIT compiled. At 524, an indication that the method identified at 510 was not executed is returned, meaning that the method may not be JIT compiled.

Figures 1, 6A:
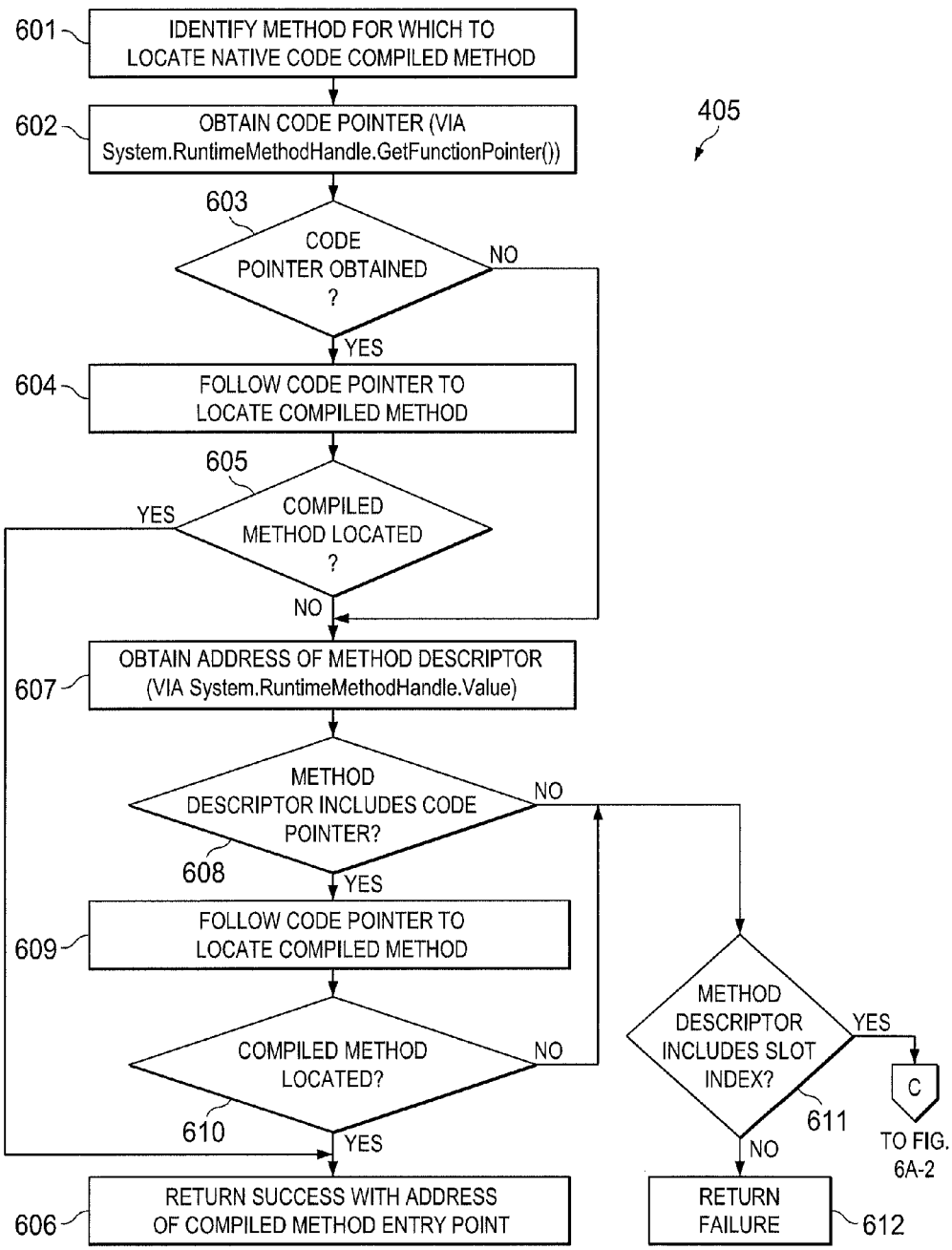
FIG. 6A is a flowchart of an example method for locating native code associated with a target method.
Figures 2, 6A:
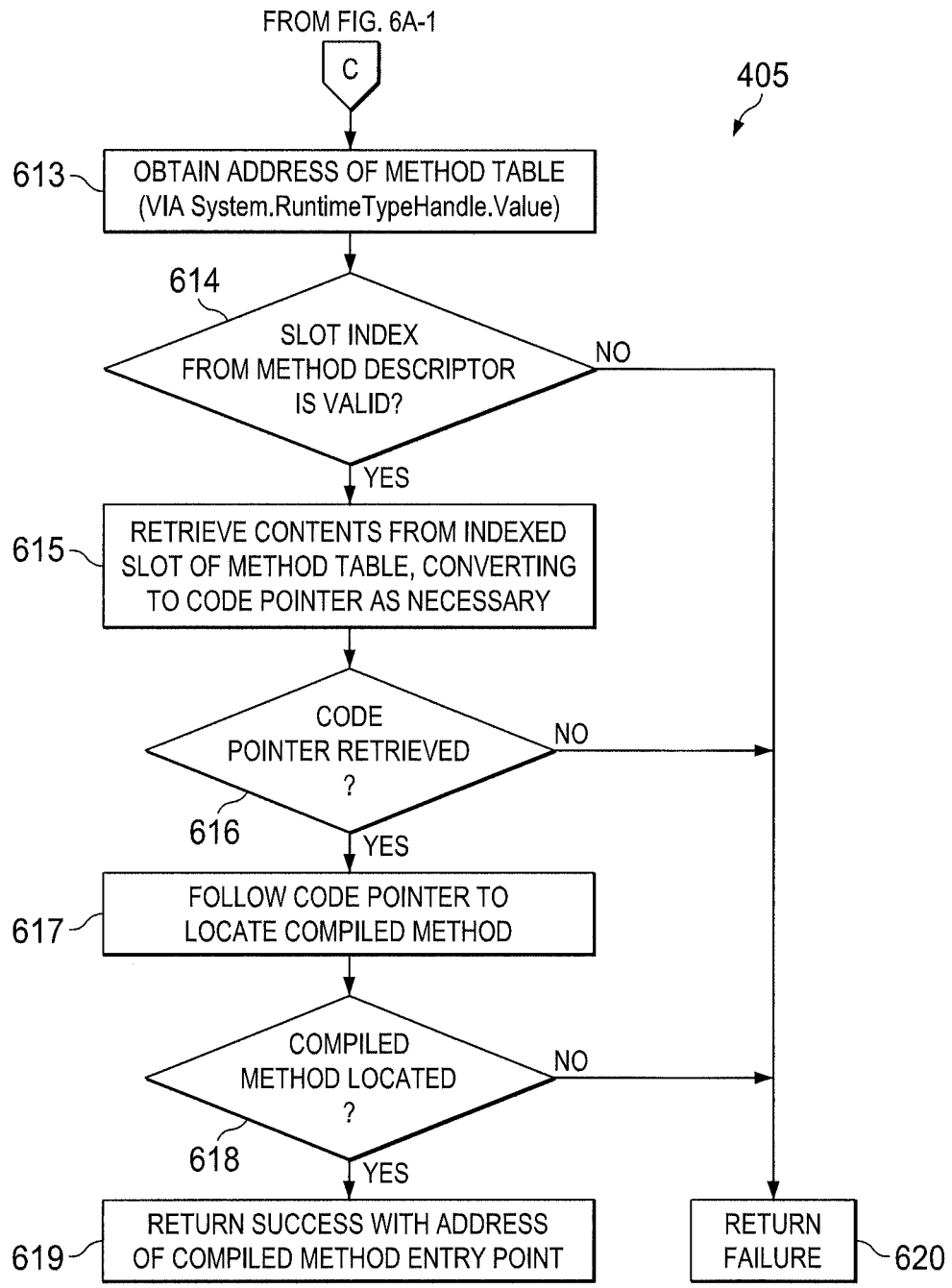

FIG. 6A is a flowchart of an example method 405 (corresponding to example operation 405 of FIG. 4) for locating native code associated with a target method. Specifically, method 405 provides one example for locating the native code entry point of a particular compiled method. At 601, a method that has already been compiled into native code (i.e., via JIT or AOT compilation) is identified to have its entry point address in memory discovered. In this example, the identified method is represented by a System.Reflection.MethodBase object; however, in other instances, the method could be identified by name and signature, or it could be represented by a System.RuntimeMethodHandle object, among other alternatives.

At 602, an attempt to locate the compiled method is performed directly. In the illustrated example, a handle for the method identified at 601 is retrieved by reading the System.Reflection.MethodBase.MethodHandle property, and then the GetFunctionPointer method of the retrieved System.RuntimeMethodHandle object is called. The returned value is a native integer expressing the address of native code associated with the compiled method, although it may not necessarily be the entry point of the compiled method itself. At 603, a determination is made as to whether the address obtained at 602 is an address of executable code. In some instances, making this determination may entail checking the permissions of memory at the obtained address (for example, by using the Windows VirtualQuery API). If it is sufficiently likely that the address is an address of executable code, method 405 continues at 604. If the address is unlikely to be an address of executable code—including, for example, if the GetFunctionPointer method returned a null address or threw an exception to indicate failure—method 405 moves to 607 to try another approach.

At 604, the instructions at the address obtained at 602 are examined. The surrounding bytes and numerical properties of the address may also be considered. If the instructions appear to constitute stub code, the address is advanced to the destination of the stub. If the instructions do not resemble a recognized stub, the address is not updated. In this example, the operations illustrated in FIG. 6B can be used to inspect and update the address. At 605, a determination is made as to whether the address produced at 604 is the entry point of the compiled method identified at 601. In one instance, the address may be assumed to correspond to the entry point if the instructions at the address do not match a recognized stub format. In another instance, the address may be considered the entry point only if the instructions at the address resemble expected prolog code. For example, the metadata or bytecode of the method may be used to guide expectations of features that should be present in the prolog code, such as an estimate of how much stack space will be allocated. In some cases, such as on 64-bit platforms, it may be possible to use exception handling data to determine whether or not an address falls within a compiled method. Other alternatives are possible as well. If the address is determined to be the entry point of the compiled method, method 405 continues at 606 to indicate success; otherwise, method 405 moves to 607 to try another approach. At 606, an indication that the entry point was successfully located, and moreover, that it was determined to be the address produced at 604, is returned.

At 607, an attempt to locate the compiled method via its method descriptor is made. In this example, a handle for the method identified at 601 is retrieved by reading the System.Reflection.MethodBase.MethodHandle property, and the address of the corresponding method descriptor is obtained from the System.RuntimeMethodHandle.Value property. At 608, a determination is made as to whether the method descriptor located at 607 is accompanied by an address of executable code. In some instances, the method descriptor may be an eight-byte structure followed by a pointer to the compiled method generated by JIT compilation. If the method descriptor includes or is accompanied by an address of executable code, then method 405 continues at 609. If no code address accompanies the method descriptor, or if the address of the method descriptor could not be obtained, method 405 moves to 611.

At 609, the instructions at the code address accompanying the method descriptor are examined. As at 604, the address may be updated based on the examined instructions. If the address produced at 609 is determined (at 610) to correspond to the entry point of the compiled method identified at 601 (i.e., according to the same tests applied at 605), then method 405 moves to 606 to indicate success. Otherwise, method 405 continues at 611.

If the method descriptor located at 607 contains a value in its slot index field that appears to be valid, method 405 moves to 613 to try a third approach for locating the compiled method. Otherwise, method 405 moves to 612 to indicate failure. At 612, method 405 indicates that no approach produced an address corresponding to the entry point of the compiled method identified at 601. At 613, method 405 identifies the type that implements the method identified at 601 and retrieves the address of the type's method table. In this example, a handle representing the type is first retrieved by reading the System.Type.TypeHandle property, and then the address of the method table is obtained from the System.RuntimeTypeHandle.Value property. Alternatively, a snitch method could be used to locate an instance of the identified type in memory, which would then permit a pointer to the method table to be retrieved. A snitch method is one way to obtain the precise internal address of a .NET object. In one implementation, a snitch method may receive a number of arguments, with some arguments taking on distinct signature values and other arguments bearing references to an object to be located. Such a method may read its own stack frame from memory, for instance using interop functionality. The method may then identify which memory locations in the stack frame contain the distinct signature values, and thereby determine which memory locations in the stack frame contain the object references, i.e., pointers to the object. The foregoing description assumes that the relevant arguments of the snitch method are pushed or spilled into stack memory. Other alternatives are possible as well. If the slot index of the method descriptor obtained at 607 appears to be valid according to various fields of the method table (as determined at 614), then method 405 continues at 615. Otherwise, method 405 moves to 620 to indicate failure.

At 615, an attempt to retrieve the contents of the slot in the method table (located at 613) indexed by the method descriptor (located at 607) is performed. In some instances, the slot contains a pointer indicating the address of native code associated with the compiled method, while in other instances, the contents of the slot may instead be an offset from the address of the slot itself, in which case a code address must be computed. At 616, a determination is made as to whether the address obtained or computed at 615 is an address of executable code (e.g., according to the tests applied at 603). If so, method 405 continues at 617; otherwise, method 405 moves to 620 to indicate failure. At 617, method 405 examines the instructions at the code address produced at 615. As described at 604, the address may be updated based on the examined instructions. If the address produced at 617 is determined at 618 to correspond to the entry point of the compiled method identified at 601 (i.e., according to the same tests as were applied at 605), then method 405 continues at 619 to indicate success. Otherwise, method 405 moves to 620 to indicate failure. At 619, method 405 indicates that the entry point of the compiled method identified at 601 was successfully located, and moreover, that it was determined to be the address produced at 617. Alternatively, at 620, method 405 indicates that no approach produced an address corresponding to the entry point of the compiled method identified at 601.

Figure 6B:
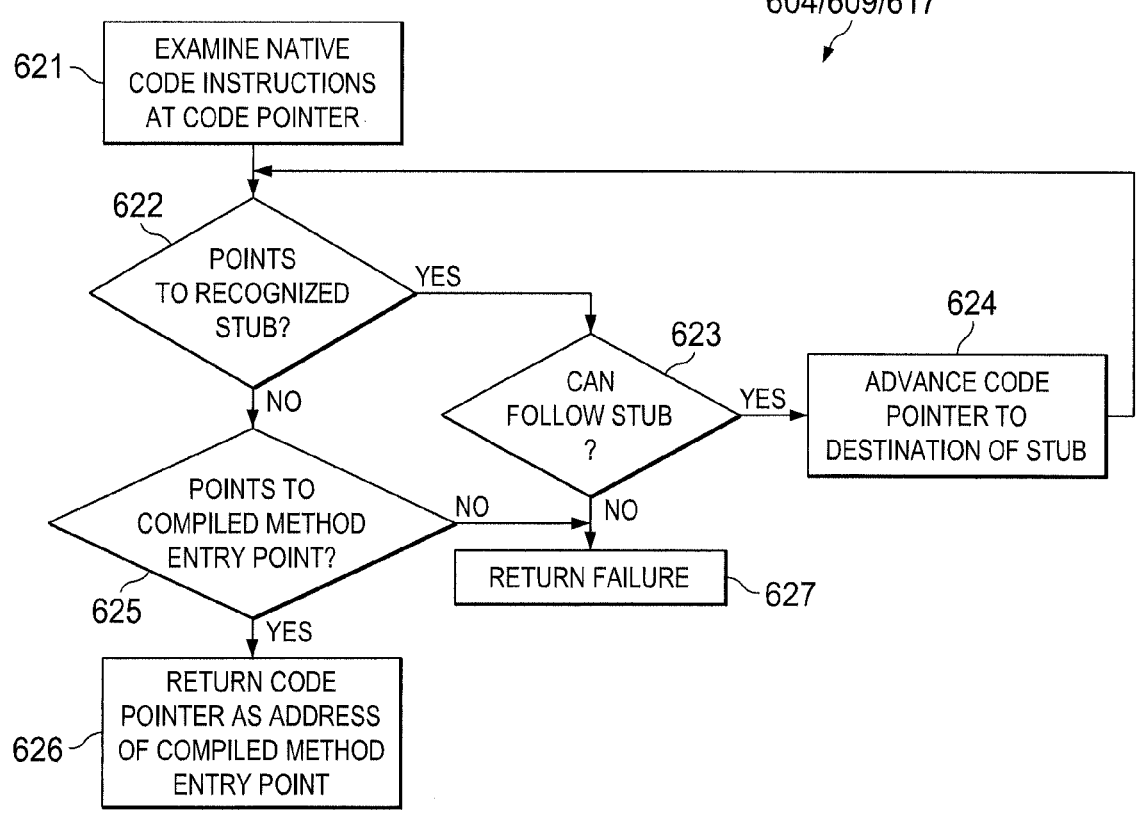
FIG. 6B is a flowchart of an example method for navigating stub code to locate the native code of an associated compiled method.

FIG. 6B is a flowchart of an example method 604 (corresponding to the example operations performed at 604, 609, and 617 of FIG. 6A) for navigating stub code to locate the native code of an associated compiled method. In other words, method 604 describes a method for examining an identified code address, advancing it if the address corresponds to the address of stub code, and returning the address if it corresponds to the entry point of a corresponding compiled method.

At 621, an address of native code is identified for examination. The determination of 622 corresponds to the beginning of a loop in method 604. At 622, a determination is made as to whether the instructions at the code address appear to constitute stub code. If so, method 604 continues at 623; otherwise, it moves to 625. At 623, a determination is made as to whether the instructions match a recognized stub format from which a destination address can be ascertained. If so, method 604 continues at 624 to perform another iteration of the loop. Otherwise, method 604 moves to 627 to indicate failure. At 624, the code address is advanced to the destination address of the stub code, and method 604 returns to 622 to perform another iteration of the loop. In some instances, there may also be useful data near the stub code, with code and data collectively constituting the stub.

At 625, a determination is made as to whether the instructions at the code address resemble expected prolog code or otherwise constitute the entry point of a compiled method, for instance, according to the same tests applied at 605. If so, method 604 continues at 626 to indicate success; otherwise, it moves to 627 to indicate failure. At 626, an indication that the code address identified at 621 (and possibly updated any number of times at 624) corresponds to the entry point of a compiled method is returned. As suggested at 605, many tests to determine if an address corresponds to an entry point are possible. Alternatively, at 627, an indication that method 604 was unable to arrive at a code address that appeared to correspond to an entry point of a compiled method is returned.

Figure 7A:
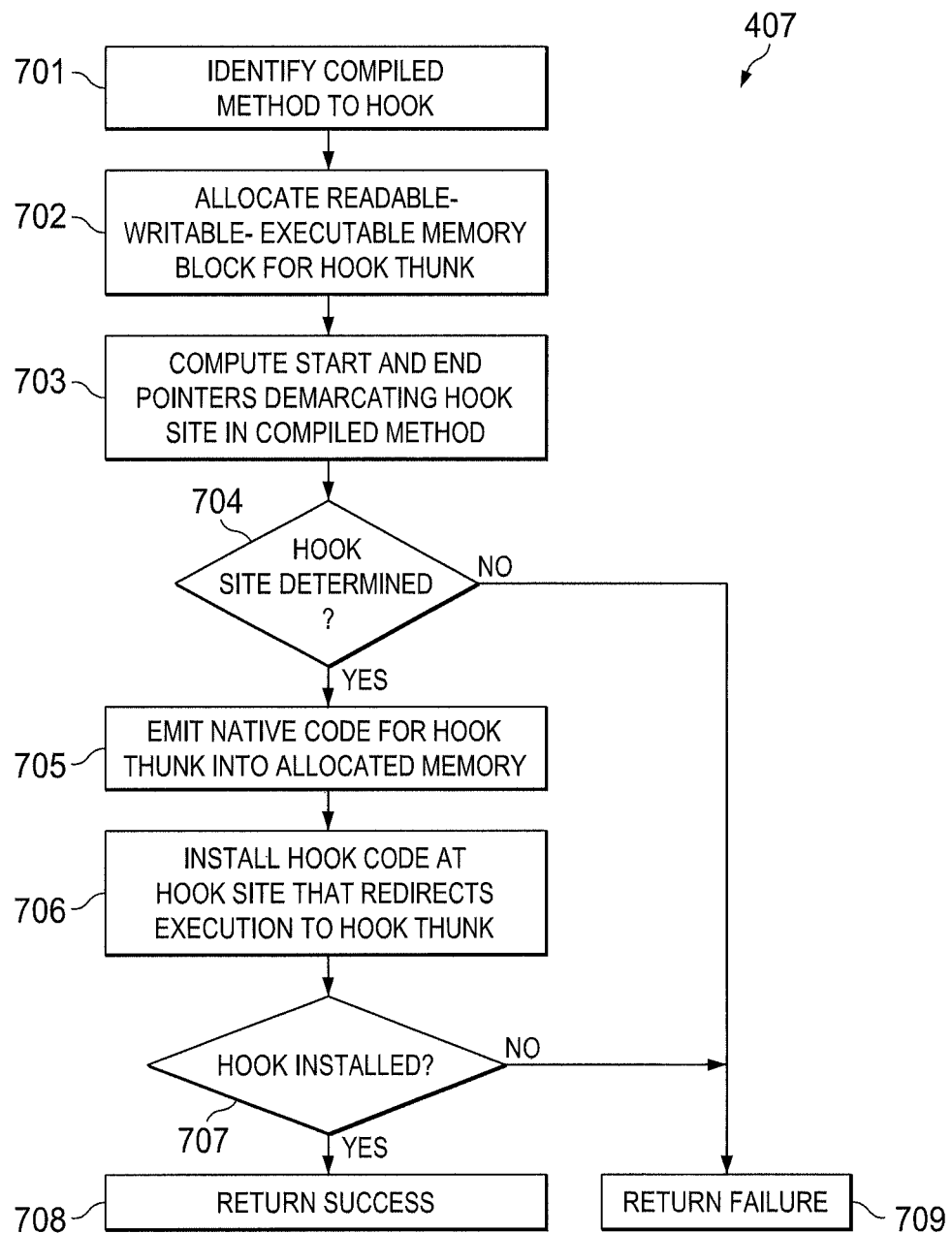
FIG. 7A is a flowchart of an example method for installing into a particular target compiled method a detour software hook that redirects execution to a given replacement compiled method.

FIG. 7A is a flowchart of an example method 407 (corresponding to the example operations of 407 described in FIG. 4) for installing into a particular target compiled method a detour software hook that redirects execution to a given replacement compiled method. In general, method 407 describes operations for installing a detour hook at the entry point of a target compiled method to redirect execution to a hook thunk that is initialized to conditionally execute a replacement compiled method.

At 701, a target compiled method to hook is identified. In this example, the target compiled method is identified by the memory address of its entry point, although other alternatives are possible. At 702, memory in which to store the native code constituting a hook thunk is allocated. The memory should be writable, at least initially, so that instructions can be stored there. Once the memory has been filled, it can be marked as executable so that the hook thunk code it contains can execute. In some instances, an overestimated or maximum amount of memory that the size of the hook thunk will not exceed may be allocated. In other instances, the memory may be allocated after the size of the hook thunk has been determined, although in some cases the size of the hook thunk may be influenced by the address at which it is located. In some instances, the memory may be allocated from a special executable heap, in which multiple hook thunks may share a single page of virtual memory in order to conserve the process's address space. In other instances, memory for each hook thunk may reside in its own page or pages of virtual memory.

Figure 7B:
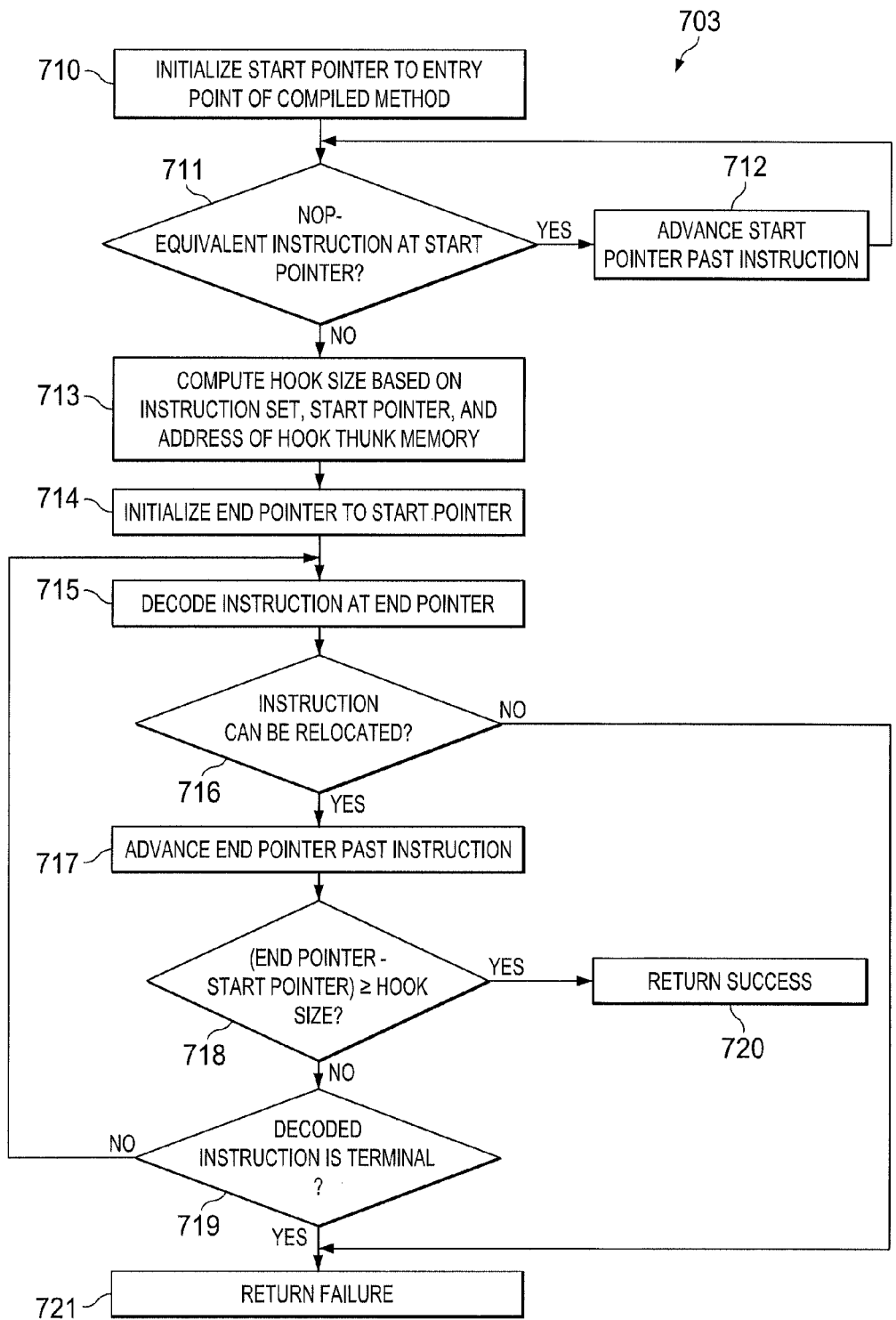
FIG. 7B is a flowchart of an example method for computing start and end pointers to demarcate a hook site near the entry point of a given compiled method.

At 703, start and end pointers demarcating the hook site in the compiled method are computed. Once the memory address of the hook thunk is known, it is possible to calculate the minimum size in bytes of a detour hook sufficient to redirect execution from the target compiled method to the hook thunk. In this example, method 703 of FIG. 7C may be used to generate detour hook code which is measured and then either discarded or retained for use at 706. Given the entry point of the target compiled method and the number of bytes that will be overwritten by the detour hook, method 407 delineates a hook site in the native code of the target compiled method, with at a start pointer indicating the first byte of the hook site and an end pointer indicating the first byte after the hook site. In this example, method 703 of FIG. 7B is used to compute the start and end pointers. If a sufficient hook site was delineated (as determined at 704), method 407 continues at 705. If the native code at the target compiled method's entry point cannot accommodate a detour hook of the required size, method 407 moves to 709 to indicate failure.

At 705, native code implementing the hook thunk is generated and stored in the memory allocated at 702. In this example, method 705 of FIG. 7D is used to generate the hook thunk code. Method 705 requires specification of a replacement compiled method, and therefore the same must be supplied to method 407. At 706, native code constituting the detour hook is generated (e.g., using method 713 of FIG. 7C), or the native code for the detour hook previously generated at 703 is retrieved. The native code is then written to the hook site delineated at 703. In this example, method 706 of FIG. 7E is used to install the detour hook in a thread-safe manner.

If the detour hook was successfully installed at 706 (as determined at 707), then method 407 continues at 708 to indicate success. If the detour hook could not be installed, method 407 moves to 709 to indicate failure. At 708, an indication that a detour hook was installed at the entry point of the target compiled method to redirect execution to a newly generated hook thunk that conditionally executes a given replacement compiled method is returned. At 709, an indication that a detour hook could not be installed at the entry point of the target compiled method is returned.

FIG. 7B is a flowchart of an example method 703 for computing start and end pointers to demarcate a hook site near the entry point of a given compiled method. At 710, an address corresponding to the entry point of a target compiled method is identified, with the start pointer initialized to reference the entry point, although it may be updated at 712 in the loop that follows. The operation at 711 constitutes the beginning of a first loop in method 703. At 711, a determination is made as to whether the instruction at the address currently referenced by the start pointer is a no-operation (NOP) or equivalent instruction. Many CPU instruction sets include a "NOP", "NOOP", or "NO-OP" opcode which has essentially no effect, but other inert instructions are also possible. For example, the x86 architecture defines a single-byte NOP opcode, but certain Microsoft compilers may as needed emit a two-byte NOP-equivalent instruction such as MOV EDI, EDI, a three-byte NOP-equivalent instruction such as LEA ECX, [ECX+0], and so on. If a method begins with any NOP-equivalent instructions, the target compiled method's true entry point (which may be targeted by recursive calls, for instance) may be located immediately afterward, and therefore this true entry point should instead be hooked. If the instruction referenced by the start pointer is a NOP-equivalent instruction, method 703 continues at 712 to perform another iteration of the first loop. Otherwise, method 703 moves to 713. At 712, the start pointer is advanced to skip the NOP-equivalent instruction and move to 711 to perform another iteration of the loop. At 713, the minimum size in bytes of a detour hook sufficient to redirect execution from the compiled method to the hook thunk is calculated. In this example, method 703 receives the size from method 407 (of FIG. 7A), which calculated the size with the use of method 713 described in FIG. 7C. In other instances, the size may be computed or recomputed during computation of the start and end pointers.

At 714, the end pointer is initialized to equal the start pointer, which was initialized at 710 and possibly updated any number of times at 712. The end pointer may be updated at 717 in the loop that follows. The operations of 715 constitute the beginning of a second loop in method 703. At 715, method 703 decodes the instruction currently referenced by the end pointer. Decoding an instruction is a CPU instruction set-dependent operation; on the x86 and x64 architectures, it may involve determining an instruction's prefixes, opcode, post-bytes, offset value, and immediate values, as applicable. At 716, a determination is made as to whether the instruction decoded at 715 can be safely relocated as part of detour hook installation. In this example, many instructions are deemed unsafe to relocate if overwriting the instruction or executing it from a different address could cause an undesired exception or a violation of other code's understanding of the execution environment. For example, relocating a relative branch instruction will likely cause an exception when that instruction is later executed, unless the instruction is adjusted to compensate for the relocation. As another example, relocating a division instruction or an instruction generated by the JIT compiler to test for a null object reference could cause exception handling to fail in the event that the instruction faults, because the relocated instruction would not be executing in an address range recognized by the runtime. If the instruction decoded at 715 can be safely relocated, method 703 continues at 717. Otherwise, method 703 moves to 721 to indicate failure. At 717, the end pointer is advanced to the address immediately following the decoded instruction. If the address of the end pointer is at least the required number of bytes after the address of the start pointer (as determined at 718), where the number of bytes is the size calculated at 713, then method 703 moves to 720 to indicate success. If the address of the end pointer is fewer than the required number of bytes after the address of the start pointer, then method 703 continues at 719.

At 719, a determination is made as to whether the instruction decoded at 715 is terminal (i.e., if instruction decoding can continue past the instruction). In this example, decoding ends after an unconditional branch, return, or call instruction is decoded, because it cannot easily be determined if valid code follows such instructions, although alternative implementations may not be so limited. In the case of a call instruction, decoding ends after the instruction both because the callee could be declared noreturn (meaning execution will never return from the callee to the instruction after the call), and because the call instruction will be rewritten as a sequence consisting of a push instruction followed by an unconditional jump instruction at 741-742 and 744-745 of FIG. 7D. If the decoded instruction is terminal in this sense, method 703 moves to 721 to indicate failure, because an insufficient number of bytes were decoded, and yet decoding cannot continue past the terminal instruction. If the decoded instruction is not terminal, method 703 moves to 715 to perform another iteration of the second loop. At 720, an indication that the start and end pointers were computed successfully for the given compiled method is returned. At 721, an indication that start and end pointers demarcating a hook site of a sufficient size could not be computed for the given compiled method is returned.

Figure 7C:
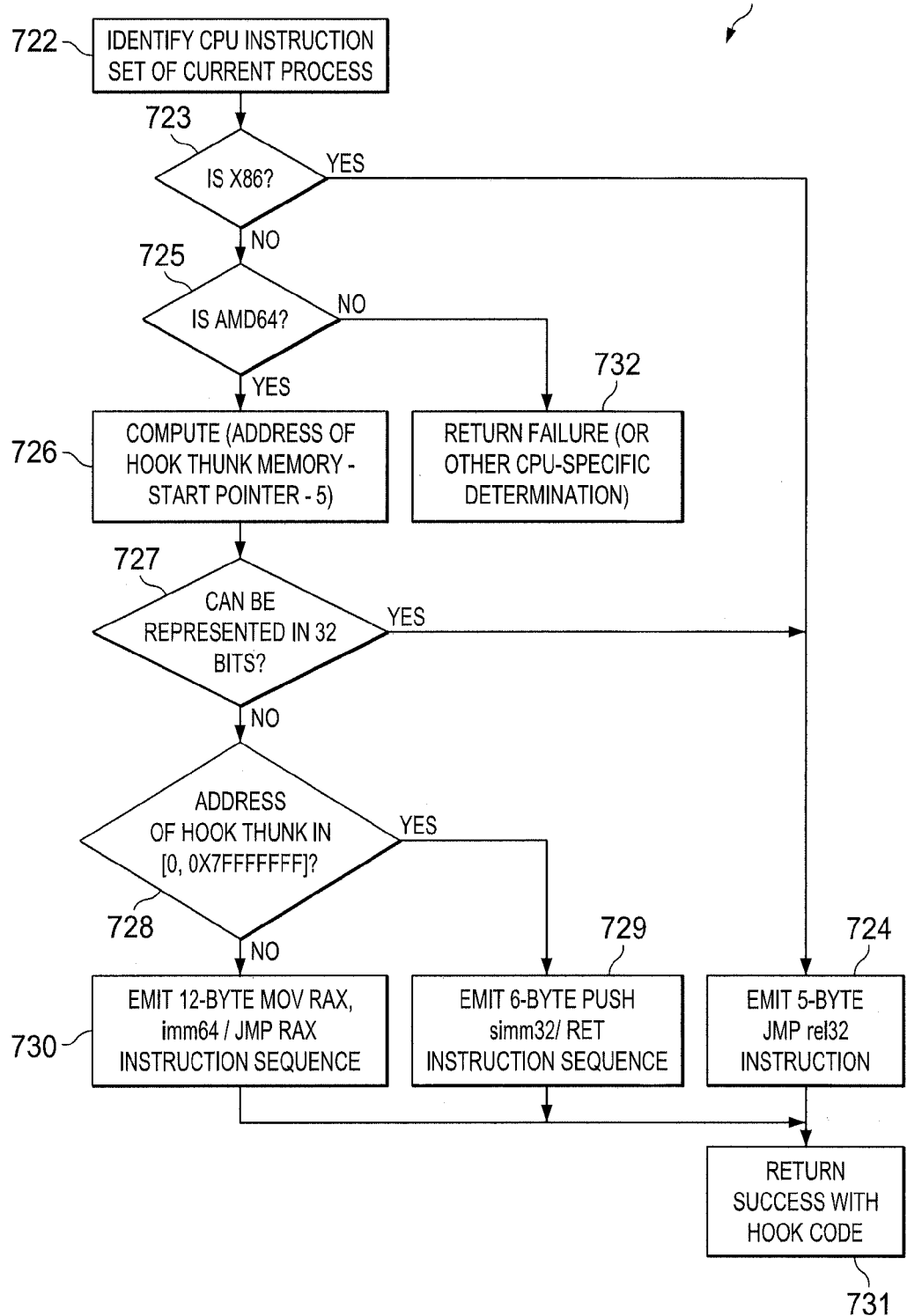
FIG. 7C is a flowchart of an example method for generating a native code implementation of a detour software hook.
Figures 2, 7D:
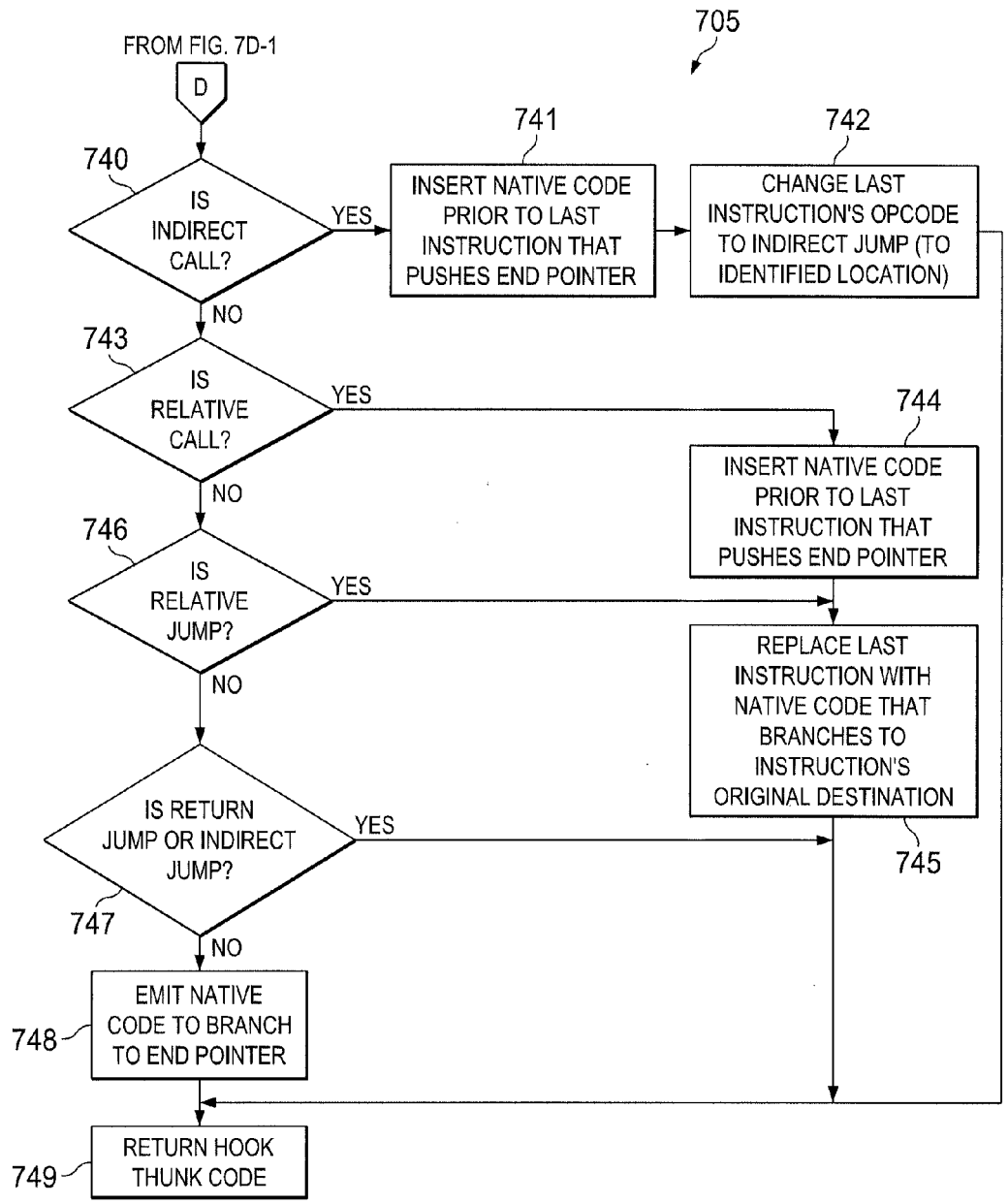
FIG. 7D is a flowchart of an example method for generating a native code implementation of a hook thunk.
Figure 7E:
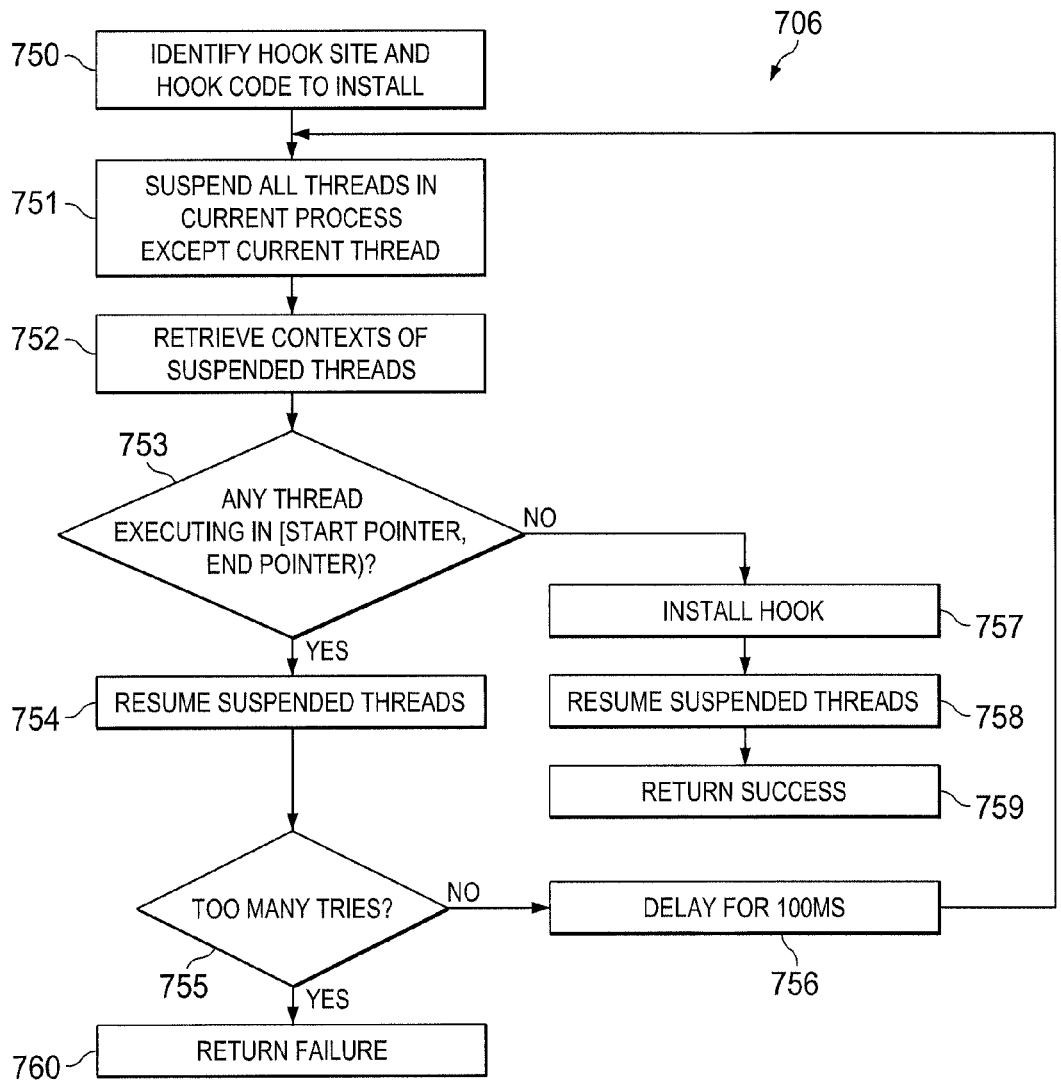
FIG. 7E is a flowchart of an example method for safely installing a software hook in a multithreaded environment.

FIG. 7C is a flowchart of an example method 713 for generating a native code implementation constituting a detour hook from a given start pointer source address to a given hook thunk destination address. In this example, method 713 is given the start pointer computed at 703 (using example method 703 illustrated in FIG. 7B) and the address of hook thunk memory allocated at 702.

At 722, the CPU instruction set used by application code executing in the current process is identified. In the illustrated example, all application code in a particular process is assumed to use a single instruction set, even though operating system code (such as the Windows on Windows emulation layer for 64-bit platforms) may use a different instruction set. In this example, it is sufficient for a software implementation of method 713 to determine the instruction set used by its own native code. This information can be retrieved with a run-time check, or it can be hard-coded at compile time through the use of preprocessor directives, among other alternatives. At 723, a determination is made as to whether the instruction set identified at 722 is 32-bit x86 (also known as IA32 or IA-32). If so, method 713 continues at 724; otherwise, method 713 moves to 725. In this example, a five-byte relative jump is sufficient to transfer execution from any address to any other address in a 32-bit x86 environment. Thus, at 724, method 713 emits such a relative jump instruction, encoded as an E 9$h$ byte representing the opcode, followed by a 32-bit integer expressing the difference between the given hook thunk address and the address that will immediately follow the instruction once it is written at the start pointer address (i.e., (hook thunk address−(start pointer address+5)). Implicit 32-bit integer truncation ensures that the relative jump instruction will arrive at the correct destination address regardless of whether the result of the calculation is positive or negative or would cause an arithmetic carry or borrow. Method 713 then moves to 731 to indicate success.

At 725 a determination is made as to whether the instruction set identified at 722 is 64-bit x64 (also known as x86-64, AMD64, Intel64, EM64T, and IA-32e). If so, method 713 continues at 726; otherwise, method 713 moves to 732 to indicate failure, or, alternatively, address other CPU-specific determinations. At 726, the offset needed to construct a five-byte relative jump that transfers execution from the start pointer address to the hook thunk address is computed. The offset is the difference between the given hook thunk address and the address that will immediately follow the instruction once it is written at the start pointer address (i.e., (hook thunk address−(start pointer address+5)), although in this case, all quantities are 64-bit signed integers). At 727, a determination is made as to whether the offset computed at 726 can be represented in 32 bits. If the offset falls within the interval [−0x80000000, +0x7FFFFFFF], then it can be expressed as a 32-bit integer, so method 713 moves to 724 to emit a comparatively size-efficient, five-byte relative jump. For any other offset, method 713 continues at 728 to consider alternative instruction sequences. If the hook thunk address can be expressed as a positive, 32-bit signed integer (as determined at 728)—in other words, if it falls within the interval [0, +0x7FFFFFFF]—then method 713 continues at 729, otherwise it moves to 730. At 729, a five-byte push-immediate instruction followed by a single-byte return instruction, for a total of six bytes of code, is emitted. This instruction sequence allows an execution transfer to an arbitrary 31-bit address, although in terms of space, it costs one byte more than a five-byte relative jump. Method 713 then moves to 731 to indicate success.

At 730, a ten-byte instruction that loads the RAX register with an arbitrary address, followed by a two-byte indirect jump instruction that accomplishes the execution transfer to that address, is emitted. Although this instruction sequence allows execution to be transferred to any valid 64-bit address, its relatively large size may prohibit hooking in some situations, and it irrevocably overwrites the original contents of the RAX register, which may not be safe in all cases. Alternative x64 instruction sequences are possible but are omitted from FIG. 7C for the sake of clarity. For example, a six-byte, RIP-relative indirect jump instruction followed by an eight-byte code pointer could transfer execution to an arbitrary 64-bit address without modifying RAX, although it requires a fourteen-byte hook site. After emitting the instructions, method 713 continues at 731 to indicate success.

At 731, an indication that the desired detour hook code was generated successfully is returned. In some instances, the indication may include the detour hook code or an address pointing thereto. At 732, an indication that the current instruction set is not supported is returned, or other CPU-specific operations may be performed. In this example, only the x86 and x64 instruction sets are supported, although additional instruction sets such as Intel Itanium (IA64 or IA-64) could be supported as well in alternative implementations.

FIG. 7D is a flowchart of an example method 705 for generating a native code implementation of a hook thunk. Specifically, method 705 is an example method for generating the native code of a hook thunk that conditionally directs execution to either a given replacement compiled method or a given target compiled method based on the current setting of a "hook state." To enable execution of the original target compiled method, method 705 also relocates instructions from a given hook site in the target compiled method to hook thunk memory, adjusting instruction pointer-dependent instructions as necessary. The native code generated can be CPU instruction set-dependent.

At 733, an address of memory in which to store the generated hook thunk code is identified. At 734, native code that preserves volatile argument registers is generated. For instance, code generated for the 32-bit x86 architecture preserves the contents of the ECX and EDX registers, which are used in the _clrcall and _fastcall calling conventions for passing arguments, but which are generally not preserved by subroutines of any calling convention. Code generated for the 64-bit x64 architecture, meanwhile, preserves the contents of the RCX, RDX, R8, and R9 registers, as these registers are used for arguments but are not required to be preserved, according to the x64 Application Binary Interface specification. Other general-purpose registers of either architecture are not typically expected to contain any meaningful value upon entry to a subroutine, so the example code generated at 734 does not preserve them unless they are nonvolatile by convention and will be temporarily modified elsewhere in the hook thunk code. In this example, a register is preserved by pushing its contents onto the stack before the first instruction or call that could modify the register, and popping the preserved contents from the stack into the register after the last instruction or call that could access the register. In this example, the only portion of hook thunk code that could modify volatile argument registers is a call to the TlsGetValue API, which is generated at 735.

At 735, code that retrieves the applicable hook state from thread-local storage (TLS) is generated. For purposes of this example, hook state is meant to refer to data indicating whether a hook thunk should transfer execution to a replacement compiled method (i.e., if the hook is enabled) or to the original target compiled method (i.e., if the hook is disabled). In this example, hook state is maintained as bits in a TLS slot accessed via the TlsGetValue Windows API function, although a TLS slot could be used to instead reference a data structure, or ThreadStatic variables, global variables, or other alternatives could be used. For purposes of this example, each TLS slot is considered to comprise 32 bits, and thus, an application that deploys more than 32 hooks must group them so that multiple hooks are jointly enabled or disabled by a single hook state bit. Groups of methods that will never directly or indirectly call or be called by one another may share a hook state bit. At 736, native code is generated that restores the contents of the volatile argument registers preserved by the code generated at 734.

At 737, native code is generated that transfers execution to the replacement compiled method if the hook state retrieved by the code generated at 735 indicates that the hook is enabled. If the hook is disabled, the generated code instead executes the original target compiled method by transferring execution to the displaced code that will be emitted at 738 and subsequently adjusted. At 738, a copy of the original code from the hook site in the target compiled method is emitted. Since the code in the hook site will be overwritten by a detour hook, a copy of that code is to be retained so that it can be executed as a prerequisite to executing the rest of the original target compiled method. However, the copy of the hook site code will not be executing at its original address, so certain adjustments may need to be made. These adjustments are the subject of the remainder of method 705; however, it should be understood that method 705 describes an example set of adjustments, and that other adjustments not described in method 705 may apply to various instructions of various CPU architectures. In some instances, an unadjusted copy of the hook site code may also be maintained, so that a hooked method may be unhooked simply by restoring the hook site to contain the original bytes of the unadjusted copy. In other instances, the adjustments may be reversed at runtime instead of maintaining separate adjusted and unadjusted copies of the hook site code.

At 739, the last instruction of the original hook site code emitted at 738 is decoded. Method 705 continues at 740 to begin adjusting the instruction as appropriate. In this example, adjustments suitable for the x86 and x64 architectures are considered, although it should be understood that related techniques may apply to other CPU architectures. At 740, a determination is made as to whether the instruction decoded at 739 is an indirect call, such as a call to an address stored in a register or memory location. If so, method 705 continues at 741 to adjust the instruction. Otherwise, method 705 moves to 743.

At 741, native code is inserted prior to the instruction decoded at 739, where the inserted instruction pushes an artificial return address onto the stack. The end pointer computed at 703 (using, for example, method 703 of FIG. 7B) references the address immediately following the last instruction included in the hook site, which is the return address that would have been pushed if the call instruction had been executed from its original location. Therefore, the end pointer address is pushed as the artificial return address. On the x86 architecture, for instance, a five-byte push-immediate instruction may be emitted, while on the x64 architecture, a twelve-byte sequence to load and push the RAX register may be emitted, among other alternatives. At 742, the instruction decoded at 739 is changed from an indirect call to an indirect jump with equivalent arguments by replacing its opcode. In some cases, however, the call instruction may need to be adjusted further, such as if it is an x64 instruction that uses RIP-relative addressing. Thus, the call instruction is replaced by native code to push an artificial return address (emitted at 741) followed by a jump instruction that transfers execution to the original destination of the call, which together emulate the operation of the original call instruction. Method 705 then moves to 749 to indicate completion and return the generated hook thunk code.

At 743, a determination is made as to whether the instruction decoded at 739 is a relative call. If so, method 705 continues at 744 to adjust the instruction. Otherwise, method 705 moves to 746. At 744, native code to push the end pointer address is inserted prior to the instruction decoded at 739. At 745, the relative call or relative jump instruction decoded at 739 is replaced with native code that transfers execution to the original destination of the instruction, as relocating a relative call or relative jump changes its destination. On the x86 architecture, an instruction of either type can simply be replaced by a five-byte relative jump with an adjusted offset, while on the x64 architecture, various instruction sequences may be possible based on the source and destination addresses. Method 705 then moves to 749 to indicate completion.

If the instruction decoded at 739 is a relative jump (as determined at 746), method 705 moves to 745 to adjust or replace the instruction. Otherwise, method 705 continues to 747. If the instruction decoded at 739 is a return instruction or an indirect jump, such as a jump to an address stored in a register or memory location, as determined at 747, then method 705 moves to 749 to indicate completion without emitting any additional code. Otherwise, method 705 continues to 748 to emit additional code. At 748, native code is emitted that transfers execution to the end pointer address, which is the address immediately following the last instruction of the hook site. Here, it is known that a hook site was successfully demarcated, and that the final instruction in the hook site is not a call, jump, return, or other terminal or invalid instruction, so it is assumed that execution will continue from the last instruction of the hook site to the first instruction after the hook site. Thus, an instruction or instruction sequence to transfer execution to the first instruction after the hook site is appended to the adjusted copy of hook site code. Method 705 then continues to 749 to indicate completion. At 749, method 705 completes by returning the generated hook thunk code.

FIG. 7E is a flowchart of an example method 706 for safely installing a software detour hook at a given hook site in a multithreaded environment. At 750, a hook site and hook code for installation are identified. The hook site is demarcated by a start pointer and an end pointer, and native code constituting a detour hook is identified to install by overwriting the hook site. The operations of 751 constitute the beginning of a loop in method 706. At 751, all threads in the process except for the current thread are enumerated and suspended, for instance by using the NtQuerySystemInformation (or CreateToolhelp32Snapshot) and SuspendThread Windows API functions. To minimize the chances of a race condition wherein a new thread is created after enumeration and therefore does not get suspended, a blocking wait may be implemented in the DLL_THREAD_ATTACH case of a DllMain function to ensure that no new threads will enter managed code whenever the wait condition is activated. After this point, the current thread should not directly or indirectly attempt to acquire ownership of any resources such as critical sections and mutual exclusion objects. As a defense against deadlocks or other indefinite waiting, the current thread may, prior to suspending or blocking any other threads, start a watchdog thread that will resume suspended threads and lift the block on new threads once the current thread has successfully installed the hook or after an amount of time has elapsed. Such a watchdog thread would not be suspended at 751.

At 752, the current thread context of each suspended thread is retrieved (e.g., by calling the GetThreadContext API function). Rather than retrieving the contexts of all suspended threads at once, it is sufficient to retrieve one thread's context and then examine it at 753 before retrieving the next thread's context. If a thread is determined at 753 to have been executing in the hook site, method 706 can then move to 754 without examining any other thread's context. At 753, a determination is made as to whether any suspended thread's context retrieved at 752 indicates that the thread was suspended while executing within the hook site, according to the instruction pointer recorded in the context. If the instruction pointer address is not less than the start pointer address of the hook site and is less than the end pointer address of the hook site, then the thread was executing within the hook site, and method 706 continues at 754. Otherwise, method 706 moves to 757 to install the hook.

At 754, method 706 resumes all threads suspended at 751, and also disables the wait condition blocking new threads if one was activated at 751. In instances where a watchdog thread was started at 751, the watchdog thread may be signaled by the current thread to resume all suspended threads and unblock new threads. At 755, a determination is made as to whether an excessive number of attempts (iterations of the loop in method 706) have been made to suspend threads such that no thread is suspended while executing in the hook site.

If so, then method 706 moves to 760 to indicate failure, rather than repeating indefinitely. Otherwise, method 706 moves to 756 to perform another iteration of the loop. At 756, the operations may optionally take a delay or "sleep" for a short interval of time to offer any threads that are executing in the hook site a chance to leave it. It is possible threads may not leave the hook site during this time, or that other threads may enter the hook site. Therefore, method 706 returns to 751 to perform another iteration of the loop.

At 757, it is known that all threads of the current process, other than the current thread and any watchdog thread created at 751, are suspended or blocked while executing outside of the hook site, and therefore it is safe to install the given detour hook at the hook site. In this example, the memory containing the hook site is made writable using the VirtualProtect API function, then the native code generated by method 713 of FIG. 7C for the detour hook is written over the hook site, the original memory permissions of the hook site are restored with another call to VirtualProtect, and the FlushInstructionCache API function is called to ensure that no processor retains the unhooked code in its cache. In some instances, the hook site may be larger than the detour hook, so it may not be necessary to operate upon the memory at the end of the hook site that is not overwritten by the detour hook. At 758, as at 754, all threads suspended at 751 are resumed, and the wait condition blocking new threads is disabled if one was activated at 751. At 759, an indication that the detour hook was successfully installed at the hook site is returned. Conversely, at 760 an indication that the detour hook could not be safely installed at the hook site is returned.

While various implementations are described in this specification, various alternatives are available and can be used. These and other alternatives are considered in addition to those examples described herein. For example, different alternatives exist for ensuring that native code exists in memory for a particular method, including the alternative of calling the JIT compiler directly. For example, the getJit export of the JIT library provides access to the JIT compiler interface, where the CILJit::compileMethod or PreJit::compileMethod function could be called to JIT compile a method by providing its bytecode.

Alternatives for locating in memory the native code of a compiled method also exist. For example, alternative means of retrieving a code pointer associated with a compiled method are available, including the use of a delegate. Once a new System.Delegate representing the method of interest has been instantiated, the delegate object's private _methodPtr and _methodPtrAux fields can then be accessed via reflection. Further, the .NET profiling API exposes functions such as ICorProfilerInfo2::GetCodeInfo2 that allow a profiler to obtain the address of a compiled method's native code; however, such functionality can only be used by a .NET profiler. Hooking the JIT compiler's compileMethod function could also provide a vantage point for locating the native code of a compiled method, although the function (and therefore the hook) may not be invoked for all methods of interest (precompiled methods, for example).

Although platform-provided means are preferable, approaches that extract internal information by unsupported means are possible. For example, one alternative means of discovering a method's entry point is to pass a delegate representing that method to an unmanaged function, which must then deconstruct the delegate data structure and/or the unmanaged-to-managed thunk in order to locate the compiled method of interest. Managed code could first call a snitch method with a long list of arguments, some of which reference an object of interest while others serve as distinct signatures. The snitch method could then call an "unsafe" or unmanaged method that reads, or enables the snitch method to read, stack memory for the purpose of locating the argument list, which is accomplished by scanning stack memory for the signatures. The object reference could then be retrieved from beside or among the signatures. In many cases, interop methods, such as those of the System.Runtime.InteropServices.Marshal class, can be used as well as unmanaged functions. With the internal address of the managed object, it is possible to read the object's member fields or locate its method table.

Still further, one approach for locating native code may comprise scanning the JIT code heap for native code matching a particular signature associated with the method of interest, based on characteristics of the method known to the developer or determined by analyzing the method's bytecode. Such characteristics may include the number of arguments, distinct integer and string constants used in the method, and calls made by or to the method. Still other means of locating native code may include using .NET Framework-provided debugging libraries such as MSCORDACWKS.DLL and SOS.DLL.

Additional methods of modifying the native code of the target compiled method to redirect execution to the native code of the replacement compiled method may be available. For example, if the replacement method entirely replaces the target method, in that the original target method will never need to be invoked, then several possibilities exist. The simplest consists of hooking the target compiled method with a branch directly to the replacement compiled method, rather than a branch to a hook thunk. Alternatively, if the replacement compiled method is no larger than the target compiled method, then the target compiled method could instead be overwritten by the native code of the replacement. Instruction pointer-relative offsets in the replacement code would need to be adjusted, or the embodying instructions would need to be translated, which could increase the size of the code in some instances and therefore require more adjustment. Code pointers, such as those of a compiled switch statement, may also be identified and adjusted. Furthermore, to prevent garbage collection from corrupting the program's state, the garbage collector's understanding of the region of overwritten code should be modified, or alternatively, garbage collection can be postponed whenever the replacement method is on the call stack. Exception information likewise should be updated or superseded by custom handling. In another example, instead of a detour hook that implements a branch, a target compiled method could be hooked with an invalid instruction, a software interrupt, a hardware breakpoint, or even a guard page, among other possibilities.

Alternatives and options for providing facilities and operations by which the replacement method can invoke the original code of the target compiled method may also be available. For instance, the replacement method may be provided with a Delegate or System.Reflection.MethodBase object that allows invocation of the original target compiled method, starting at the displaced code rather than at the hooked entry point. With the ability to execute the original target compiled method through a specially-purposed object, the concept of "hook state" would become obsolete, as the replacement method would not need to temporarily disable the hook in order to execute the original implementation of the target compiled method. The object could be passed to the replacement method by the hook thunk in the form of an additional argument, although this may require the hook thunk to shift the intercepted arguments in order to insert a new one. The object could also be stored in a static field, or in a global data structure that the replacement method would access using some hook-specific identifier as a key, in order to look up the relevant object.

Alternatively, a different hooking model where the replacement method serves more as a filter could be implemented. In this model, the target compiled method would still be hooked with a branch to a hook thunk, but the hook thunk would then call a "pre-filter" method, which would have the opportunity to examine and modify function arguments and other execution state before the original target method executes, or it could request that the hook thunk return a particular value directly without invoking the original target method at all. If the pre-filter does indicate that processing should continue, the hook thunk calls the original target method, and then passes the return value and original arguments (for reference) to a "post-filter" method, which may change the return value as desired. Other suitable alternatives can be used or included in the methods and systems of the present disclosure as appropriate.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a non-transitory computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The terms "processor" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of any implementation or of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for installing software hooks into software code, the method comprising:
   identifying, using at least data characterizing an identity of a target method, the target method and a hook code, where the hook code is to execute instead of at least a portion of the target method, and wherein the target method and the hook code are executed within a managed code environment;
   locating a compiled version of the target method and a compiled version of the hook code in memory, where the compiled versions of the target method and the hook code are compiled in native code, wherein the locating comprises:
      forcing compilation of the target method to create the compiled version of the target method in memory to ensure that compiled code exists for the target method, wherein the compilation is forced by invoking the target method with default parameter values supplied and exceptions caught, the default parameter values predefined to cause the target method to throw an exception once invoked;
      forcing compilation of the hook code to create the compiled version of the hook code in memory; and
   modifying the compiled version of the target method by storing the hook code at or near an entry point of the compiled version, wherein the hook code, when executed, directs execution of at least a portion of the compiled version of the target method to the compiled version of the hook code.

2. The method of claim 1, wherein the compiled version of the hook code executes instead of at least a portion of the compiled version of the target method.

3. The method of claim 1, wherein a non-compiled version of the target method is originally stored as bytecode.

4. The method of claim 1, further comprising:
   omitting forced compilation of the target method if the compiled version of the target method exists in memory; and
   omitting forced compilation of the hook code if the compiled version of the hook code exists in memory.

5. The method of claim 1, wherein forcing compilation of the target method and the hook code includes performing a just-in-time compilation performed by a just-in-time compiler and determining whether the compiling succeeded.

6. The method of claim 1, wherein locating the compiled version of the target method includes:
   obtaining a code pointer associated with the compiled version of the target method;
   following the code pointer to a memory address of the compiled version of the target method; and
   identifying a memory address of an entry point of the compiled version of the target method.

7. The method of claim 1, wherein the hook code comprises a compiled replacement method.

8. The method of claim 1, wherein modifying the compiled version of the target method comprises overwriting at least a portion of the compiled version of the target method with the compiled version of the hook code.

9. The method of claim 8, wherein execution of the hook code causes execution of a hook thunk, where the hook thunk contains at least one instruction for conditionally transferring execution to an identified replacement method.

10. The method of claim 9, wherein the hook thunk includes at least a portion of the modified portion of the compiled version of the target method, and wherein the hook thunk conditionally transfers execution to the identified replacement method based at least in part on a variable accessed by the hook thunk.

11. The method of claim 1, wherein modifying the compiled version of the target method to direct execution of at least a portion of the target method to the compiled version of the hook code includes:
   allocating memory for a hook thunk containing a reference to at least a portion of the compiled version of the hook code;
   computing a hook site within the compiled version of the target method, the hook site comprising a start point memory address and an end point memory address;
   storing compiled code implementing the hook thunk in the allocated memory;
   generating compiled code implementing a hook to the compiled version of the hook code, where the hook causes execution of the hook thunk stored in the allocated memory; and
   storing the generated compiled code implementing the hook to the compiled version of the hook code to the hook site.

12. The method of claim 1, wherein modifying the compiled version of the target method to direct execution of the portion of the compiled version of the target method to the compiled version of the hook code is performed at runtime.

13. The method of claim 1, wherein the managed code environment comprises a managed .NET environment.

14. An article comprising a non-transitory, machine-readable storage device storing instructions which, when executed, cause at least one processor to perform operations comprising:
   identifying, using at least data characterizing an identity of a target method, the target method and a hook code, where the hook code is to execute instead of at least a portion of the target method, and wherein the target method and the hook code are executed within a managed code environment;
   locating a compiled version of the target method and a compiled version of the hook code in memory, where the compiled versions of the target method and the hook code are compiled in native code, wherein the locating comprises:
      forcing compilation of the target method to create the compiled version of the target method in memory to ensure that compiled code exists for the target method, wherein the compilation is forced by invoking the target method with default parameter values supplied and exceptions caught, the default parameter values predefined to cause the target method to throw an exception once invoked;
      forcing compilation of the hook code to create the compiled version of the hook code in memory; and
   modifying the compiled version of the target method to direct execution of at least a portion of the compiled version of the target method to the compiled version of the hook code.

15. The article of claim 14, wherein the compiled version of the hook code executes instead of at least a portion of the compiled version of the target method.

16. The article of claim 14, wherein a non-compiled version of the target method is originally stored as bytecode.

17. The article of claim 14, wherein locating the compiled version of the target method comprises:
   obtaining a code pointer associated with the compiled version of the target method;
   following the code pointer to a memory address of the compiled version of the target method; and
   identifying a memory address of an entry point of the compiled version of the target method.

18. The article of claim 14, wherein the hook code comprises a compiled replacement method.

19. The article of claim 14, wherein modifying the compiled version of the target method comprises overwriting at least a portion of the compiled version of the target method with the compiled version of the hook code.

20. The article of claim 19, wherein execution of the hook code causes execution of a hook thunk, where the hook thunk contains at least one instruction for conditionally transferring execution to an identified replacement method.

21. The article of claim 20, wherein the hook thunk conditionally transfers execution to the identified replacement method based at least in part on a variable accessed by the hook thunk.

22. The article of claim 14, wherein modifying the compiled version of the target method to direct execution of the portion of the compiled version of the target method to the compiled version of the hook code is performed at runtime.

23. The article of claim 14, wherein the managed code environment comprises a managed .NET environment.

24. A system, comprising:
   a memory operable to store a plurality of methods associated with at least one application;
   one or more processors coupled to the memory that:
      identify, using at least data characterizing an identity of a target method, the target method and a hook code, where the hook code is to execute instead of at least a portion of the target method, and wherein the target method and the hook code are executed within a managed code environment;
   locate a compiled version of the target method and a compiled version of the hook code in memory, where the compiled versions of the target method and the hook code are compiled in native code, wherein the locating comprises:
      forcing compilation of the target method to create the compiled version of the target method in memory to ensure that compiled code exists for the target method, wherein the compilation is forced by invoking the target method with default parameter values supplied and exceptions caught, the default parameter values predefined to cause the target method to throw an exception once invoked,
      forcing compilation of the hook code to create the compiled version of the hook code in memory,
      obtaining a code pointer associated with the compiled version of the target method,
      following the code pointer to a memory address of the compiled version of the target method, and
      identifying a memory address of an entry point of the compiled version of the target method; and
   modify the compiled version of the target method by storing the hook code at or near the entry point of the compiled version, wherein the hook code, when executed, directs execution of at least a portion of the compiled version of the target method to the compiled version of the hook code.

* * * * *